United States Patent [19]

Farr

[11] Patent Number: 4,633,152
[45] Date of Patent: Dec. 30, 1986

[54] DIRECT CURRENT MOTOR CONTROLLER

[75] Inventor: Aaron V. Farr, Logan, Utah

[73] Assignee: Abex Corporation, Stamford, Conn.

[21] Appl. No.: 676,038

[22] Filed: Nov. 29, 1984

[51] Int. Cl.⁴ ............................................... H02P 5/06
[52] U.S. Cl. ................................... 318/257; 318/268; 318/318
[58] Field of Search .............. 318/255, 256, 257, 258, 318/259, 260, 375, 376, 379, 268, 318

[56] References Cited

U.S. PATENT DOCUMENTS

| | | | |
|---|---|---|---|
| 3,465,227 | 9/1969 | Ivie et al. | 318/260 X |
| 3,636,424 | 1/1972 | Reed | 318/259 |
| 3,735,223 | 5/1973 | Fort et al. | 318/258 |
| 4,002,960 | 1/1977 | Brookfield et al. | 318/257 |
| 4,188,569 | 2/1980 | Campbell | 318/375 |
| 4,388,570 | 6/1983 | Sangree | 318/255 |
| 4,416,352 | 11/1983 | Husson et al. | 318/257 X |

Primary Examiner—William M. Shoop, Jr.
Assistant Examiner—Bentsu Ro
Attorney, Agent, or Firm—Thomas S. Baker, Jr.

[57] ABSTRACT

A control for controlling the operation of a direct current motor by select application of a three phase alternating current line input of given frequency to the armature thereof through solid-state forward and reverse designated switches which are gated by select enable inputs.

42 Claims, 10 Drawing Figures

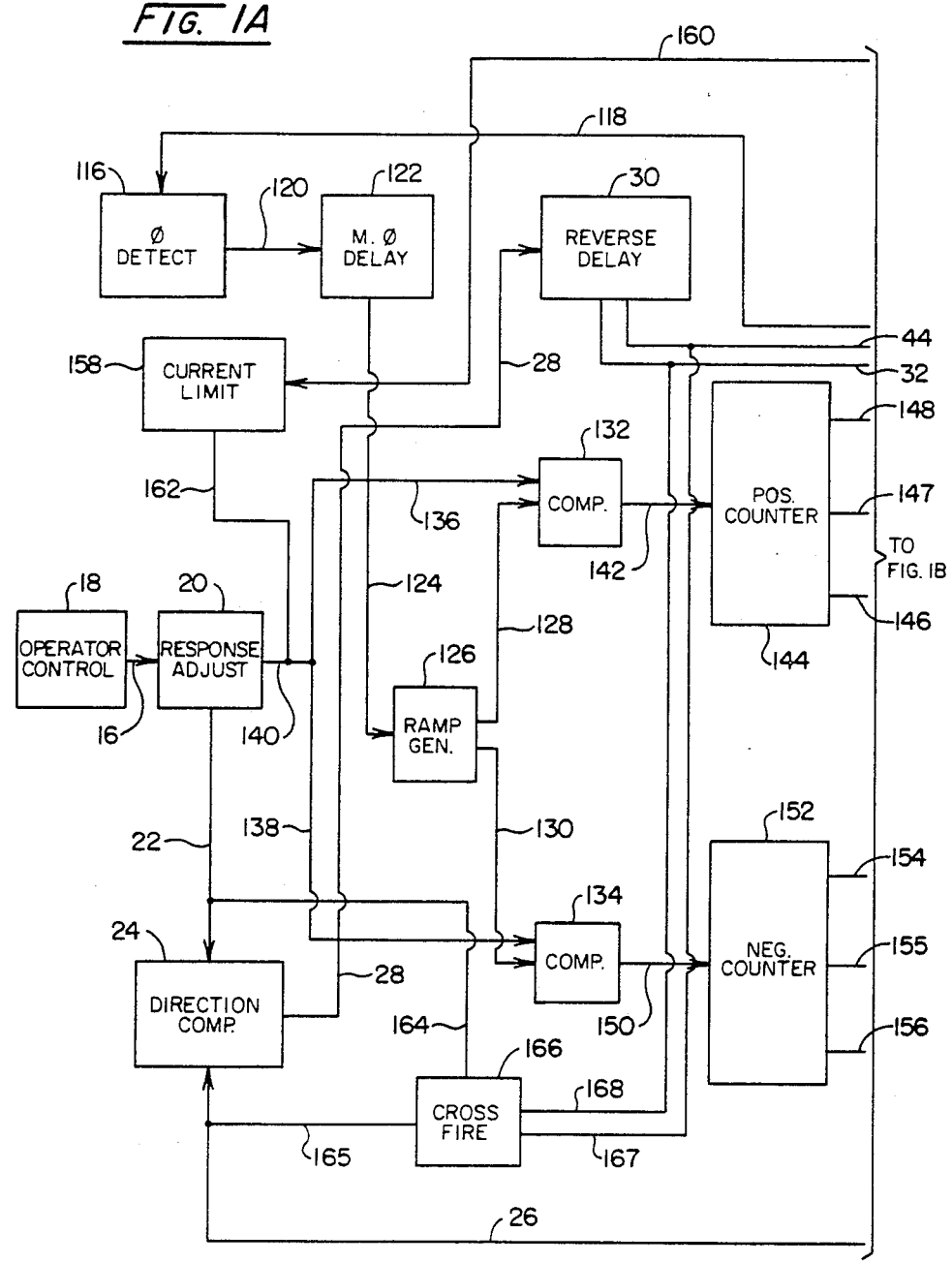

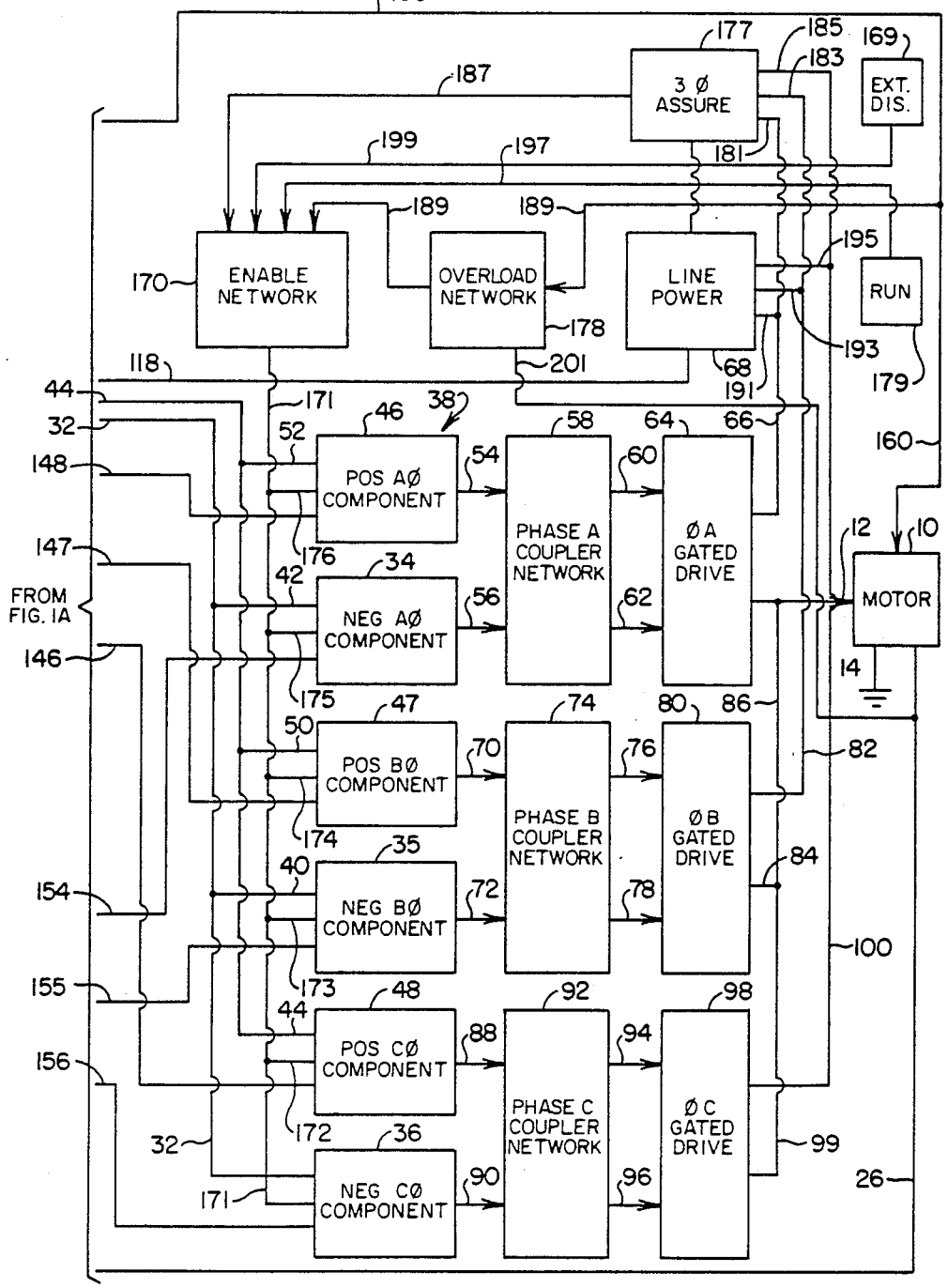

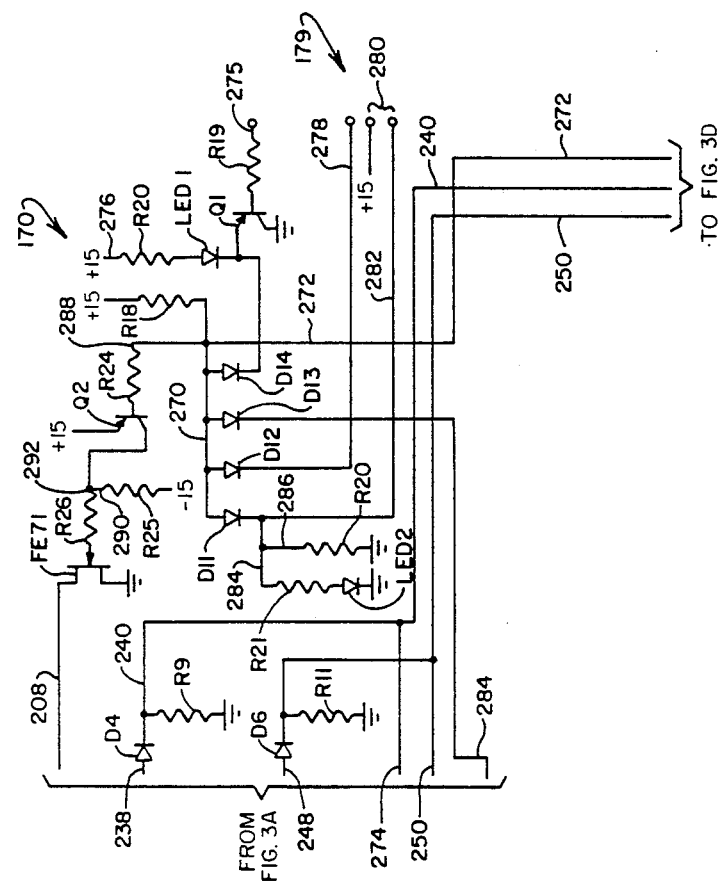

FIG. 3C

DIRECT CURRENT MOTOR CONTROLLER

BACKGROUND OF THE INVENTION

This invention relates to a controller for a direct current motor which drives an aircraft passenger boarding bridge. More specifically, it relates to a controller for a three-phase powered, variable speed, reversible, direct current motor which drives an aircraft passenger boarding bridge. This motor may be series-wound, shunt-wound, compound-wound, permanent magnet, etc.;

In order to service an aircraft, the end of an aircraft passenger boarding bridge remote from the terminal must be driven toward and away from a parked aircraft. Typically, a set of wheels which support the remote end of the bridge are driven by an electric motor to move the bridge. Because of the relatively heavy weight and massive structure of a bridge, precise control of the drive motor is required to assure that the bridge does not contact an aircraft with sufficient force to cause damage to it. Such a motor must be reversible and must be able to drive the wheels at various speeds so that the speed of the bridge can be reduced as it approaches an aircraft. The direct current motor controller of the instant invention sets the speed and direction of rotation of the d.c. motor which drives the wheels mounted on the bridge.

The speed of a d.c. motor is a function of the field and armature voltages. Control and adjustment of armature voltage results in a variable speed constant torque drive. Control and adjustment of field voltage results in a constant horsepower drive. For aircraft passenger boarding bridge application, it is desirable to provide a variable speed constant torque drive. Accordingly, the controller of the instant invention adjusts the speed of the motor by regulating armature voltage. Direction of rotation of a d.c. motor is determined by whether power is supplied to the motor from the positive or negative half of the three-phase alternating current power input. During operation of the motor, one set of switching devices is actuated sequentially by the controller to cause a portion of the positive half of the line phases to pass to the motor armature to cause the motor to rotate in one direction or another set of switching devices is actuated sequentially to cause a portion of the negative half of the line phases to pass to the armature to cause the motor to operate in the other direction.

Motor speed is controlled by modulating the percentage of the total time period of each of the three phases during which the phases are connected to the armature, from a minimum of 0 to a maximum of 100 percent. In some d.c. motor controllers presently in use, a ramp in the form of a linearly increasing or decreasing voltage is generated and timed such that the initial voltage of the ramp begins to decrease or increase at the beginning of the maximum time period of a line phase in a three-phase system and the end of the ramp is timed to coincide with the end of the period of the line phase. In order to determine the period of time each phase is connected to the motor armature in order to have the motor attain a commanded speed, a reference voltage corresponding to the commanded speed is compared with the ramp voltage. The controller is adjusted such that for maximum speed the reference voltage equals the ramp voltage correponding to the beginning of the period of one phase and for 0 speed the reference voltage equals the ramp voltage corresponding to the end of the period of one phase. When the ramp voltage falls or rises to the reference voltage, the controller supplies a signal which actuates appropriate switching devices which sequentially connect the positive or negative portions of the line phases to the motor armature for the length of time required for the motor to attain the commanded speed and direction of rotation.

Because of the relatively large mass of an aircraft passenger boarding bridge a controller for a motor driving the bridge must be able to safeguard the motor and the bridge when a commanded input to the motor exceeds the capability of the motor or the drive mechanism. For example, the controller must set a rate of response of the motor to a commanded input which will not allow the motor to spin the wheels of the bridge drive when the input is calling for the drive to accelerate the bridge. Additionally, the motor controller must be able to prevent the commanded input from commanding a speed which will cause the motor to require a current or voltage in excess of its rated maximum. Further, the controller must insure that the bridge has stopped moving in one direction before it actuates the switching devices which pass line phases of opposite polarity to drive the motor in the other direction. Also, when the commanded input is less than the speed of the bridge and the bridge is driving the motor the controller should be able to cause the motor to go into a regeneration mode and give up power to the line so that the motor will help decelerate the bridge.

A controller for a motor which drives an aircraft passenger boarding bridge must be able to interrupt power to the motor under a number of conditions for safety reasons. Some of these conditions are when a bridge "run" switch on the operator control console is open, when a "disable" switch at a remote location such as at the motor when the drive is being serviced is open, when one of the three line phases is missing or the phases are out of order and when the motor is overloaded.

In known three-phase, half wave powered, variable speed, reversible d.c. motor controllers, six ramp generators are required; one for the positive and one for the negative half of each of the three line phases. Each ramp generator has a potentiometer, a current limiter, a voltage divider, a ratio compartor, etc. Additionally, since the ramps for the three phases must be generated sequentially, the ramp generators must be adjusted to precisely follow each other. These adjustments are critical, difficult to attain and difficult to maintain. Thus, such controllers have many components, are large, complex, expensive, and require numerous critical adjustments. It is desirable to provide a controller for a three-phase, half wave powered, variable speed, reversible, direct current motor which is relatively simple, inexpensive, compact and does not require multiple ramp generators and numerous adjustments in order to sequentially generate a ramp for each of the three phases. It is also desirable to provide a controller for a direct current motor which drives an aircraft passenger boarding bridge, which provides an adjustable motor response rate which limits the input command to prevent the motor from requiring a current or voltage in excess of its rated maximum, which prevents simultaneous connection of line phases of opposite polarity and which enables the motor to regenerate power to the line.

Additionally, it is desirable to provide a controller for a direct current motor which drives an aircraft passenger boarding bridge which interrupts power to the motor when line power phases are missing or out of order, when control switches are open and when the motor is overloaded.

SUMMARY OF THE INVENTION

This invention provides a three-phase, half-wave powered, variable speed, reversible, direct current motor controller which utilizes a single ramp generator in combination with a counter to sequentially connect a portion of each of the line phases to the motor to obtain a desired speed and direction of rotation. In the controller, an adjustment is provided for the rate of response of the motor to an input command, means are provided to limit the input command to prevent the motor from requiring a current or voltage in excess of its rated maximum, means are provided to prevent simultaneous connection to the motor of line phases of opposite polarity and means are provided to enable the motor to regenerate power to the line. Further, the controller includes means to interrupt power to the motor when line phases are missing or out of sequence, when control switches are in a disable condition or when the motor is overloaded.

Another object of the invention is to provide a control circuit for controlling the operation of a three-phase powered, direct current motor by select application of a three-phase line input of given frequency to the armature thereof through solid-state forward and reverse designated switches which are selectively gated by phase responsive gate signals. A command means is provided to provide command signals having a polarity and value corresponding with a selected direction of rotation and motor speed. An armature response means is provided for deriving armature signals corresponding with the instantaneous value of voltage applied to the motor armature. Forward enable logic means are included which are responsive to provide the forward gate signals in the presence of predetermined forward enable inputs for gating the forward designated switches and reverse enable logic means are included which are responsive to provide reverse gate signals in the presence of predetermined reverse enable inputs for gating the reverse designated switches. A first stage means is provided which compares the command signals and the armature signals and provides an output representing the difference therebetween. Further, an integrator stage means is provided which is responsive to the first input stage means output and has a select time constant for deriving a response adjusted output with a polarity defining directional aspect. A mixing means is provided for directing select portions of the armature signals and the response adjusted output in common to the first input stage means. Further provided is a directional comparator means for receiving the response adjusted output and the armature signals and responsive to forward and reverse conditions thereof provides a first forward enable input in the presence of the forward conditions and provides a first reverse enable input in the presence of the reverse conditions.

A further object is to provide a control circuit for controlling the operation of a three-phase powered, direct current motor by select application of a three-phase line input of given frequency to the armature thereof through gateable, solid-state, forward and reverse designated switches. A command network means is provided for providing a direction and rate output in response to a command input. A filter means is provided for receiving a single-phase input from the line and providing a time varying output in correspondence therewith. A phase delay means responsive to the time varying output provides a phase delay output corresponding with the commencement of derived power implementation of one phase of the three-phase input. Further, a ramp network means is provided which commences the generation of a select first ramp signal in response to the phase delay output. A second ramp signal is generated in correspondence to and simultaneous with the first ramp signal. Also provided is a rate comparator means which is responsive to the first and second ramp signals and to the command network means output for deriving corresponding first and second phase responsive operation signals. An oscillator means provides a precision time varying output corresponding with line frequency. A counter means is provided which is responsive to the first and second phase responsive operation signals and the precision, time varying output and commences the mutually timed sequential provision of three phase designated forward gate signals and three phase designated reverse gate signals. Further provided is a forward enable logic means responsive to each discrete forward gate signal for selectively gating the forward designated switches and a reverse enable logic means responsive to each discrete reverse gate signal to selectively gate the reverse designated switches.

It is another object of the instant invention to provide a control circuit for controlling the operation of a three-phase powered, direct current motor by select application of a three-phase line input of given frequency to the armature thereof through gateable solid-state forward and reverse designated switches. A command network means is provided for providing a direction and rate output in response to a command input and an armature responsive means is provided for deriving armature signals corresponding with the instantaneous value of voltage applied to the armature. A forward enable logic means provides forward gate signals in the presence of predetermined forward enable inputs for gating the forward designated switches and a reverse enable logic means provides reverse gate signals in the presence of predetermined reverse enable inputs for gating the reverse designated switches. A first input stage means is provided which is responsive to compare the command signals and the armature signals and provides an output representing the difference therebetween. An integrator stage means is provided which is responsive to the first input stage means output and has a select time constant for deriving a response adjusted output with a polarity defining direction aspect. A directional comparator means which receives the response adjusted output and the armature signals and is responsive to forward and reverse conditions thereof provides a first forward enable input to the forward enable logic means in the presence of the forward conditions and provides a first reverse enable input to the reverse enable logic means in the presence of the reverse conditions. Filter means receive a single-phase input from the line and provide a time varying output in correspondence therewith. Phase delay means responsive to the time varying output provides a phase delay output corresponding with the commencement of derived power implementation of one phase of the three-phase input. A ramp network means is provided for commencing the generation of a select first ramp signal in response to the phase delay output. A second ramp signal is generated in correspondence to and simultaneously with a first ramp signal. A rate comparator means is provided which is responsive to the first and second ramp signals and to the command network means output for deriving corresponding first and second phase responsive operation signals. An oscillator means provides a precision time varying output corresponding with line frequency. Also provided are counter means which are responsive to the first phase responsive operation signal and the precision time varying output to commence the mutually-timed sequential provision of three phase-designated forward gate signals and responsive to the second phase responsive operation signal and the precision time varying output to commence the mutually-timed sequential provision of three phase-designated reverse gate signals. A forward enable logic means is provided which is responsive to each discrete forward gate signal for selectively gating the forward designated switches and a reverse enable logic means is provided which is responsive to each discrete reverse gate signal to selectively gate the reverse designated switches.

Other objects of the invention, in part, will be obvious and, in part, will appear hereinafter.

The invention, accordingly, comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1A is the first half of a block diagram which generally illustrates the circuit of the controller of the instant invention;

FIG. 1B is the second half of a block diagram which generally illustrates the circuit of the controller of the instant invention;

FIGS. 3A and 3B are schematic circuit diagrams of that portion of the controller circuit which determines the direction of rotation of a motor and monitors certain external conditions;

FIGS. 3C and 3D are schematic circuit diagrams of that portion of the controller circuit which determines the speed of a motor;

FIG. 4 is a diagram showing the mutual orientation of FIGS. 3A–3E which may be combined to form a unitary circuit.

DETAILED DESCRIPTION

Figure 5:
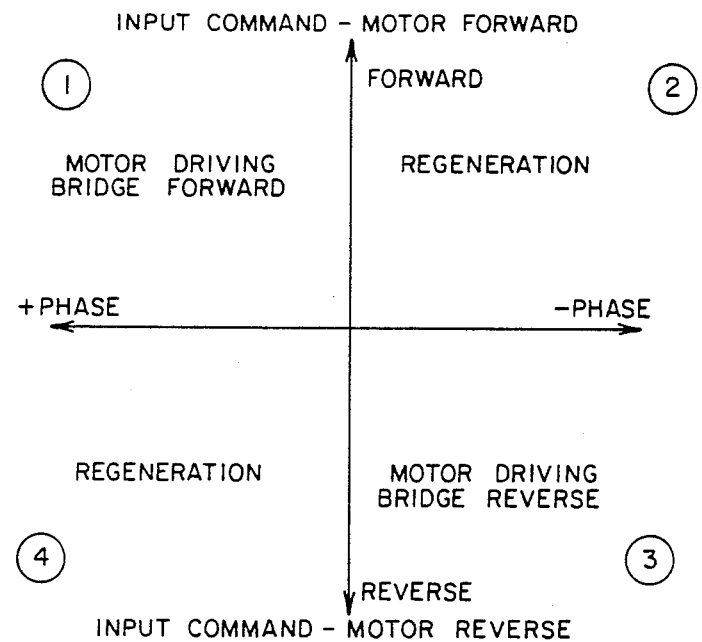
FIG. 5 is schematic portrayal in quadrature of the operating modes of a d.c. motor.

The controller of the instant invention sets the speed and direction of rotation of a three-phase, half-wave powered, variable speed, reversible direct current motor which drives an aircraft passenger boarding bridge in response to a commanded input. This motor may be series-wound, shunt-wound, compound-wound, permanent magnet, etc. Of course, other applications of the controller will occur to those skilled in the art. Generally, such motors are operated in response to a drive under which select components of an available three-phase power supply are applied to its armature. In the embodiment described herein, drive is developed through the select gating of paired silicon controlled rectifiers (SCRs) which respond to line power input as well as to command signals applied to gates thereof through a coupling network. The generation of a command input commences with operator manipulation of a control device such as a joy stick which command then is conditioned to accommodate for the particular utilization of the controller noted above. In the discourse to follow, the circuit of the controller is described initially in generalized block diagrammatic fashion, following which the individual networks and the like making up this diagram are treated in enhanced detail.

Looking to FIGS. 1A and 1B, a d.c. motor is represented at block 10. Motor 10 receives a control drive input from line 12 and is shown coupled to ground through line 14. A command to motor 10 is developed by an operator control function represented at block 18 in FIG. 1A, the output of which is represented by a line 16. Line 16 is shown directed to the input of a response adjust network at block 20 which serves to treat the command signal at line 16 to accommodate for the requirements of the noted aircraft passenger loading bridge application. In this regard, the response adjust serves to modify the response of the command input such that drive commands and the like are tempered to avoid unacceptable accelerative performance.

One output of the response adjust network 20 is directed as represented by line 22 to a motor direction comparator network represented by block 24. Network 24 monitors the then direction of rotation of motor 10 as provided from monitoring line 26 and ascertains whether the actual direction of rotation of the motor 10 complements the direction of rotation newly required by any command signal at line 16. The resultant output at line 28 from network 24 is one which indicates whether or not the imposed command input at line 16 is directing the motor 10 to alter its then ongoing rotation and speed condition. In this regard, line 28 is shown directed to a reverse delay network represented at block 30. Network 30 responds to the output at line 28 in the event of a required motor direction change to impose a delay to assure that no positive and negative phase inputs to the motor are simultaneously activated. Where no motor reversal is present, no delay is imposed. Note that one output from the reverse delay network 30 at line 32 is connected to the negative phase components 34–36 of an activation logic network represented generally at 38 in FIG. 1B. In this regard, note that line 32 extends to the C phase component 36 of the activation logic network 38, while the same line extends through line 40 to the B phase component 35 of the activation logic network 38 and through line 42 to the A phase component of the activation logic network 38. A second output of network 30 at line 44 serves to provide one enabling input to the positive phase components 46–48 of the activation logic network 38. In his regard, note that line 44 extends to the C positive phase component 48 of the activation logic network 38 while the same line extends through line 50 to the B positive phase component 47 of the activation logic network 38 and through line 52 to the A phase component of the activation logic network 38.

The outputs of the positive A phase component 46 and negative A phase component 34 of network 38 are shown directed along respective lines 54 and 56 to a phase A coupler network 58 which develops corresponding isolated positive and negative phase designated outputs shown, respectively, at lines 60 and 62. Lines 60 and 62 are directed to the inputs of a phase A gated drive network represented at block 64. The network 64 responds to line power input from line 66 extending, in turn, to the line power source represented at block 68 and provides one output to the earlier-discussed line 12 which output is a select portion of either the positive or negative component of phase A line power to motor 10.

In similar fashion, the positive and negative activation components for the B phase of power as represented, respectively, at blocks 47 and 35 are shown providing outputs at respective lines 70 and 72. Lines 70 and 72 are directed to a phase B coupler network represented at block 74 serving the same function as the network described at block 58. The positive and negative phase designated outputs of network 74 are represented, respectively, at lines 76 and 78 which are directed to the inputs of a phase B gated drive network represented at block 80. Network 80 derives its power input from line 82 extending from line power source 68 and serves to provide a controlled B phase output at line 84 which extends through line 86 to line 12 and, thence to the input of motor 10.

The positive and negative components for the C phase of power of the activation logic network 38 at blocks 48 and 36 are shown having outputs, respectively, at lines 88 and 90 which are directed to the inputs of a phase C coupler network represented at block 92. Network 92 performs the noted isolation function and provides positive and negative designated phase drive outputs at respective lines 94 and 96 to a phase C gated drive network represented at block 98. Block 98 receives its line power input via line 100 from line power source 68 and provides a controlled C phase output at line 99 which extends through line 86 which, as in the case of phases A and B is directed to line 12 and to the input of motor 10.

The output of response adjustment network 20 further is directed as represented by lines 22 and 164 to a cross-fire network represented by block 166. Network 166 monitors the response adjust network 20 to determine if a command input is present which calls for the motor 10 to run, and additionally, monitors the speed and rotation of motor 10 as derived from lines 26 and 165. If cross-fire network 166 determines there is no command input calling for the motor 10 to rotate and that the motor 10 is in fact not rotating, an output is supplied simultaneously to lines 168, 167 which are directed, respectively, to lines 32 and 44. These lines 32, 44 are connected respectively to the negative phase components 34–36 and the positive phase components 46–48 of network 38 as previously described. The resultant association causes the negative and positive phase components 34–36 of activation logic network 38 to be activated simultaneously to thereby maintain continued control over the motor 10 even when it is stopped. Such cross-fire functions to prevent a load from driving the motor 10 when it is stopped.

Figure 2:
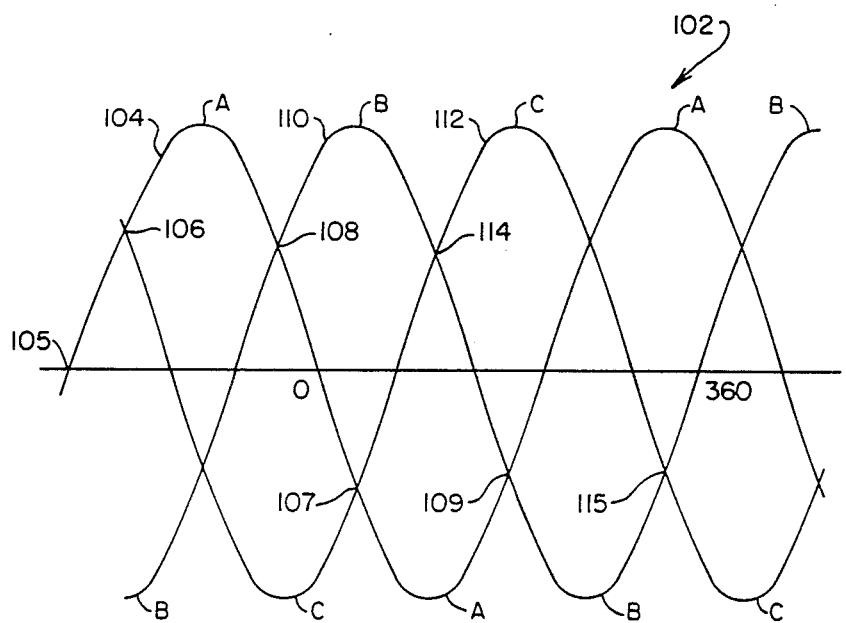
FIG. 2 is a drawing of the three line phases of voltage input to a motor controlled by the subject controller.

In addition to the directional inputs to the activation logic network 38, an input is supplied which corresponds to the degree or amount of energization to be imposed upon the armature of the motor from line 12 to establish the speed of the motor. In a three phase drive for a d.c. motor, a constraint is imposed upon the drive signal, inasmuch as only a singular phase component may be applied at any given time and only the positive or negative aspect of that phase may be applied except during the cross fire condition. Referring momentarily to FIG. 2, a classic three-phase sinusoidal phase diagram of line power is represented generally at 102. Note that the positive going component of the labeled phase A curve at 104 exists in isolation from the positive phases B and C only between the intersecting points 106 and 108. In normal forward operation of motors as at 10, the earliest that phase A component 104 can be utilized commences with the position shown at 106. In similar fashion, the earliest position which the positive going portion of phase B can utilized, for example for component 110 will be at point 108. Likewise, the positive going component of phase C as at portion 112 can earliest be utilized commencing with the location of the curve at point 114. Assuming an opposite motor direction, the same criteria hold for the negative going components of phases A, B, and C. In normal reverse operation of motor 10, the earliest that the negative phase A component 104 can be utilized commences with the position shown at 107. In similar fashion, the earliest position which the negative going portion of phase B can be utilized, for example for component 110 will be at point 109. Likewise, the negative going component of phase C as at 112 can earliest be utilized commencing with the location of the curve at point 115.

To accommodate for the utilization of positive and negative phase components as described, the circuit of the invention detects the negative to positive cross-over point at 105 of one (A) phase of the three phase input and applies a select master phase delay. Returning to FIGS. 1A and 1B, the cross-over or phase detection function is represented at block 116 which is shown having an input from line power source 68 thrugh line 118. The detection of phase designated cross-over is presented at an output line 120 which is directed to the input of the master phase delay function as represented at block 122. Function 122 serves to delay the earliest time the phase components can be initiated from the point of cross-over to the positions as described above in FIG. 2 as represented at points 106, 107, 108, 109, 114, or 115. Upon treating the line power input with the delay function 122, a resultant delayed output is provided along line 124 to a ramp generator function represented at block 126. The ramp generator function represented at block 126 provides synchronized positive going and negative going linear output signals which correspond with the maximum time a line phase can be connected to the motor. These output signals are provided at respective output lines 128 and 130 which are directed, respectively, to one input of two comparator functions shown at blocks 132 and 134. The opposite inputs to the comparator functions represented at blocks 132 and 134 are provided, respectively, from lines 136 and 138 which, in turn, are coupled through line 140 to the output of the response adjust network represented at block 20. Such inputs from lines 136, 138 correspond to a commanded motor speed. Comparator functions 132 and 134 provide signals at their outputs when the level of the signals at input lines 128 and 130 from the ramp generator function 126 reach the level of the signals at respective lines 136 and 138 derived, in turn, from response adjust network block 20. In other words the comparator represented at blocks 132 and 134 provide an output corresponding to the length of time the three line phases power components are directed to the motor 10 armature to effect reaching the speed called for by the command input at line 16.

The output of the comparator function 132 is represented at line 142 as being directed to the input of a positive counter function represented at block 144. The function at block 144 serve to respond to the input at line 142 and provide three corresponding outputs in sequential fashion at its output lines 146–148. Note that line 146 is directed to one input of the positive C phase component 48 of activation logic network 38, while line 147 is directed to the positive B phase component 47 of the network 38 and line 148 is directed to the positive A phase component 46 of network 38. These sequential outputs at lines 146–148 provide properly phase designated and timed signals which are utilized to activate the respective coupler networks 58, 74, 92 to provide positive phase designated outputs at corresponding lines 60, 76 and 94 to gated drive networks 64, 80 and 98. Such outputs are utilized to provide positive three phase drive inputs through line 12 to motor 10 to cause its rotation in a forward direction.

The output of comparator function 134 is represented at line 150 as being directed to the input of a negative counter function represented at block 152. The function at block 152, like that represented at block 144, serves to respond to the input at line 150 and provide three corresponding outputs in sequential fashion at its output lines 154–156. Line 154 is directed to one input of negative A phase component 34 of activation logic network 38. Line 155 is directed to one input of negative B phase component 35 of network 38 and line 156 is directed to one input of negative C phase component 36 of network 38. The sequential outputs at lines 154–156 provide properly phase designated and timed signals which are utilized to activate the respective coupler networks 58, 74 and 92 to provide negative, phase designated outputs at corresponding lines 62, 78 and 96, to gated drive networks 64, 80 and 98. Such outputs are utilized to provide negative three phase drive inputs through line 12 to motor 10 to cause its rotation in a reverse direction.

A current limiter function represented by block 158 receives an input from the motor 10 armature through line 160 and is connected to the output of response adjustment network 20 at line 140 through line 162. In the event the signal received from the operator control command represented by block 18 calls for the motor to demand a current greater than is permitted, current limiter function 158 will reduce the magnitude of the operator control signal output at response adjustment network 20 at line 140 until the speed demanded by the operator control function is low enough that the current limit is not exceeded.

An enable network 170 (FIG. 1B) simultaneously supplies a third enabling input to the positive phase components 46–48 of the activation logic network 38 as well as to the negative phase components 34–36 thereof when signals are received from each of a series of externally monitored functions which indicate each such function is appropriately set for operation of motor 10. These enabling inputs are provided as an output line 171 connecting network 170 directly to the negative C phase component 36 of network 38; as line 172 leading to the positive C phase component 48; as line 173 leading to the negative B phase component 35; as line 174 leading to the positive B phase component 47; as line 175 leading to the negative A phase component 34; and as line 176 leading to the positive A phase component 46.

Looking to the operational functions which are monitored, a line phase monitoring network represented at block 177 is connected to each of the three phases output from the power line source represented at block 68 through lines 181, 183, 185, 191, 193, 195. If all three line phases are present in their proper order, network 177 provides an enabling signal to network 170 through line 187. An overload network 178 which checks for an over voltage or over current condition of the armature receives an input from the motor armature through lines 189 and 160. If there is no overload condition, network 178 outputs an appropriate signal through line 189 to network 170. A motor run switch represented at block 179 located on the control console of the passenger boarding bridge allows an operator to activate or deactivate the motor drive. For example, when the run switch represented at block 179 is closed, an appropriate signal is provided to the enable network 170 through line 197. When the run switch 179 is open, a corresponding signal is provided to network 170. An external disable switch represented at block 169 is provided to enable a maintenance person to disable the motor 10 from a remote location on the bridge. When the external disable switch is closed, a signal is provided to the enable network 170 through line 199. Correspondingly, when the external disable switch 169 is open, a disable input is supplied to network 170 through line 199. Thus, means are shown for providing three enabling inputs to the positive 46–48 or negative 34–36 phase components of the activation logic network 38 to effect motor 10 operation in one direction or the other.

FIGS. 3A–3E describe the circuit of FIGS. 1A and 1B in enhanced detail and these figures should be considered in conjunction with the orientations thereof shown in FIG. 4.

RESPONSE ADJUST NETWORK

Figure 3A:
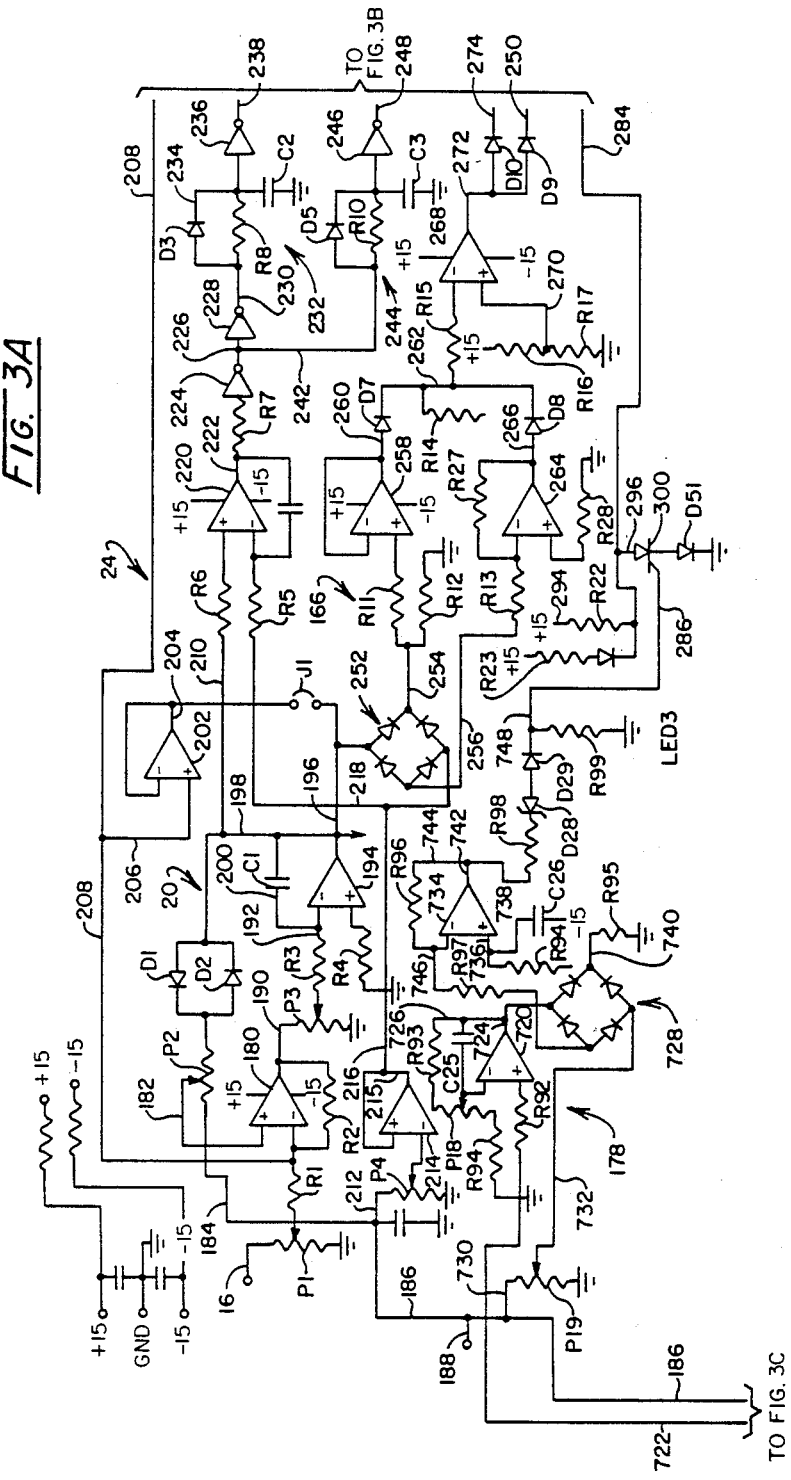

Referring to FIG. 3A, the earlier-described operator controlled voltage level output line 16 again is reproduced. Line 16, carrying a voltage signal corresponding in magnitude and polarity to an input command from the operator, is directed to a potentiometer P1, the winding of which is connected to ground. The wiper arm of potentiometer P1 is connected through a resistor R1 to the negative input terminal of an operational amplifier 180. Potentiometer P1 serves as a level adjustment for the command signal at line 16 and is positioned at one input to a "variable rate" amplifier network representing a component of the earlier described response adjust network 20. The opposite input to amplification stage 180 is derived from the wiper arm 182 of another potentiometer P2. One end of the winding of potentiometer P2 is coupled through lines 184, 186 and 188 to the armature voltage output of motor 10, for example as described in conjunction with line 26 in FIG. 1. This armature derived input is highly "pulse active" and erratic in nature. Thus, for a condition wherein the wiper arm of potentiometer P2 is essentially in one extreme position, amplification stage 180 serves to compare the command input through resistor R1 with the actual value of armature voltage through line 182 to provide an output at line 190 representing a difference value.

Output line 190 is coupled in feedback fashion through resistor R2 to the negative input terminal of stage 180. Stage 180 being, in effect, a high gain differentiator, the output thereof will rapidly swing from the extremes of plus 15 volts to minus 15 volts depending upon the inputs. Output line 190 is shown directed to one end of the winding of a potentiometer P3, the opposite end of which is connected to ground. The wiper arm of potentiometer P3 is coupled through resistor R3 and line 192 to the negative input terminal of another operational amplifier 194. The positive input of amplification stage 194 is tied to ground through resistor R4. The output of stage 194 at line 196 is coupled in feedback fashion to its negative input terminal through line 198, line 200 which contains a feedback capacitor C1 and line 192 to form an integrator configuration. When the output of stage 180, being either plus or minus 15 volts, is applied to potentiometer P3 and resistor R3, a constant current is caused to flow to the negative input of amplification stage 194. This current causes capacitor C1 to charge and discharge at a time constant established by the setting of potentiometer P3. Accordingly, the output of amplification stage 194 changes smoothly at a rate determined by that time constant regardless of the output of amplification stage 180. Input amplification stage 180 and integrator stage 194 thus serve to impose a response delay over the input signal to the motor initiated at line 16. The rate of this response can be adjusted through user adjustment of the wiper arm setting at potentiometer P3 and may range from thirty milliseconds to three seconds.

Line 198, extending from the output 196 of amplification stage 194, is shown directed through a pair of bi-directionally coupled diodes D1 and D2 to the opposite side of the winding of potentiometer P2. Diodes D1 and D2 decouple the output of amplification stage 194 from potentiometer P2 and provide a deadband of approximately 0.6 volts when the output is essentially the same as the positive input to amplification stage 180. Thus, the feedback signal values which are directed to the positive input terminal of amplification stage 180 may be varied or mixed to correspond with a ratio of a value representing the input command signal at line 16 or the instantaneous armature voltage value emanating from line 188. Thus, a form of adjustment is provided for determining how close instantaneous armature voltage tracks a commanded armature voltage. In other words, potentiometer P2 adjusts the response of the system and the adjustment weights the response with respect to either the control signal out of the armature or input command signal out of the joy stick. This matches the control to the characteristics of the motor and the device it is driving, i.e. a passenger boarding bridge. For example, in a passenger board bridge application, the inertia of the motor is slowing the control loop. By adjusting the potentiometer P2, the response of the control can compensate for the motor inertia. It may be observed that where the wiper arm is manipulated so that it exhibits essentially only armature voltage from line 188, then such armature voltage will tend to track the command voltage within, for example, about one percent as the motor is excited from a no load condition through full load. On the other hand, if the wiper arm of potentiometer P2 is adjusted to the opposite extreme, such that it exhibits the treated command input signal from output line 196, then a significantly greater variation will be exhibited between the instantaneous armature voltage and the corresponding command signal value as the motor 10 is driven from no load to full load. This variation may range, for example, up to about 20 percent.

Where desired, the function of the response adjust network 20 may be deleted altogether through the utilization of the signal output of a buffer 202 at line 204. Note in this regard that the positive input terminal of buffer 202 is coupled through lines 206 and 208 to the negative input terminal of amplification stage 180. The corresponding negative input terminal of buffer stage 202 is coupled with line 196 containing a jumper J1. With this arrangement, when jumper J1 is operationally positioned within the circuit, the level adjusted output from potentiometer P1 is directed through lines 208 and 206 to buffer stage 202 and thence through lines 196 and 198 to, line 210 to which the output of amplification stage 194 is also connected.

DIRECTION COMPARATOR

As discussed in connection with FIG. 1A, one output of the response adjust network 20 is directed to a directional comparator function as discussed in conjunction with block 24. The comparator function as described at block 24 looks at a value of armature voltage from the motor 10 as represented at line 26 in FIG. 1A. This signal is developed in the circuit of FIG. 3A at line 212 from lines 186 and 188. Line 212 extends to one side of the winding of a potentiometer P4, the opposite side of which is connected to ground. The wiper arm of potentiometer P4 extends to the negative input terminal of a buffer 214. The output of buffer 214 at line 215 is coupled in feedback fashion to the positive input terminal. Furthermore, the output of buffer 214 at 215 is connected through line 216 and direction line 218 incorporating resistor R5 to the negative input terminal of a comparator stage 220. The positive input to stage 220 is provided at line 210 carrying resistor R6 and exhibits the earlier-noted command input signal from amplification stage 194. Accordingly, the output of comparator stage 220 at line 222 will be a logic high value or logic low value depending upon the operational condition of motor 10 and the input command at 16 from the operator. Recall from the discussion in conjunction with FIG. 1A that the motor can be driven forwardly with the enablement of positive phase components 46–48 of activation logic network 38 and can be driven in a reverse direction with the enablement of negative phase components 34–36 of activation logic networks 38. The motor also can be in a regeneration mode of operation for either forward or reverse drive.

These four operating modes or quadrants of motor 10 can best be understood by referring to FIG. 5. Quadrant one represents the conditions of an operator input command calling for the motor to rotate in a forward direction and the motor rotating in that direction at or below the commanded speed. In quadrant two the motor is rotating in the forward direction at a speed greater than called for by the input command and power from the motor is absorbed by the line (regeneration). Quadrant three represents an input command calling for the motor to operate in a reverse direction and the motor is rotating in that direction at or below the commanded speed. In quadrant four, the motor is rotating in the reverse direction at a speed greater than called for by the input command and power from the motor is absorbed by the line (regeneration).

Considering a forward or positive drive control input from the operator to the motor 10, and assuming that the motor has responded fully, then a positive voltage value will be impressed upon the positive input terminal of comparator 220 through resistor R6 and a corresponding positive voltage value will be asserted at the negative terminal thereof through resistor R5, however, of slightly lesser extent. The corresponding output line 222 of the comparator 220 will be a logic high value.

On the other hand, if the operator releases the joy stick or control input at line 16 or manipulates it such that the forward drive input to the motor 10 is removed, then a regeneration condition obtains and the resultant voltage values at the input of comparator 220 will be such that the voltage impressed from resistor R6 will be slightly less than that impressed through resistor R5. In consequence, the output at line 222 assumes a logic low value.

Now considering the operation of direction comparator network 24, where positive drive is being asserted to motor 10, the above-noted logic high signal at line 222 is asserted through resistor R7 and is inverted at inverter 224 to provide a logic low signal at line 226. Line 226, in turn, is directed to the input of an inverter 228 which converts the logic low signal at line 226 to a logic high signal at line 230 which provides an input to an R-C network 232 comprised of resistor R8 and capacitor C2. Resistor R8 is selectively by-passed in the presence of the noted positive signal by line 234 containing diode D3. Thus, the signal serves both to charge capacitor C2 and is directed to the input of another inverter stage 236. The resultant output of stage 236 at line 238 is a logic low signal which is introduced through diode D4 to line 240 (FIG. 3B). A stabilizing resistor R9 is coupled between line 240 and ground. The logic low signal at line 240 functions to selectively disable the negative phase components 34-36 of activation logic network 38. Three negative phase components 34-36 are only enabled when a logic high signal is developed at line 240. The positive phase components 46-48 and the negative phase components 34-36 of activation logic network 38 are again represented in FIG. 3D. Each of the positive phase components 46-48 includes one respective three input AND gate 233, 235, 237 while each of the negative phase components 34-36 also includes a respective three input AND gate 239, 241, 243. Line 240 is connected directly to the negative C phase AND gate 243; through line 245 to the negative B phase AND gate 241 and through line 247 to the negative C phase AND gate 239.

Enablement, however, is provided to the positive phase components 46-48 of activation logic network 38 by virtue of a signal developed from line 226 (FIG. 3A). It may be observed that a line 242 couples line 226 with an R-C network 244 comprised of resistor R10 and capacitor C3. As in the case of network 232, a diode D5 is provided in by-pass relationship with resistor R10. The output of network 244 is directed to the input of an inverter stage 246 and, for the noted logic low input thereto, serves to provide a logic high signal at line 248. This logic high signal at line 248 is directed through diode D6 (FIG. 3B) which leads, in turn, to line 250. As before, a stabilizing resistor R11 is provided between line 248 and ground. Line 250, carrying the noted logic high signal for the drive condition described, leads to the positive phase components 46-48 and serves to provide for the assertion of positive drive input to the motor 10. Looking to FIG. 3D, line 250 is seen to be connected directly to the postive C phase AND gate 237; through line 249 to the positive B phase AND gate 235; and through line 251 to the positive A phase AND gate 233.

Now, assuming that the operator manipulates the signal at line 16 to effect a reversal of the motor or the motor is put in a regenerative mode, then, as above discussed, the output of comparator stage 220 at line 222 assumes a logic low signal. This initiates the reverse delay represented at block 30 in FIG. 1A. Referring again to FIG. 3A, this logic low value is inverted by inverter 224 to provide a logic high value at line 226. The resultant high logic value is applied to line 242 and is directed through diode D5 to charge capacitor C3, as well as being directed to the input of inverter stage 246 to immediately provide a logic low value at line 248. In consequence, the enabling signal at line 250 is removed and the line 250 carries a logic low signal.

Now considering the corresponding alteration of the enabling signal at line 240, it may be observed that the logic high signal at line 226 is directed through inverter 228 to provide a logic low signal at line 230. This logic low signal, however, does not immediately affect the signal input to inverter stage 236 by virtue of the performance of R-C network 232. Capacitor C2 will commence to discharge through resistor R8 which will cause the input of inverter stage 236 to remain at a logic high value and the output of inverter stage 236 at line 238 to remain at a logic low value until such time as the discharge of capacitor C2 at its input reaches a signal value of about one-third of the negative going threshold characteristic thereof, the inverter being selected having a hysteresis operational characteristic. Thus, a delay, for example, of about 36 to 40 milliseconds is imposed in the system before the enabling logic high value signal is permitted to occur at line 240. The delay assures that the positive and negative phase components of network 38 are not simultaneously enabled except in an idle state.

As is apparent, should the operator manipulate the signal at line 16 such that a command is given to the motor 10 to cause it to immediately assume a forward rotational direction or to cause a motor operating in the reverse direction to go into the regeneration mode, essentially the opposite logic alteration would obtain. In this regard, the output of comparator 220 at line 222 would then assume a logic high value which would be reflected at the output of inverter 224 as a logic low value at line 226. This logic low value at line 226 would immediately remove the logic high value at line 240 as above-described and would be asserted through line 242 to R-C network 244. Capacitor C3 of that network would commence to discharge holding the logic high value input to inverter stage 246 until the earlier-described one-third of threshold voltage is reached. Thus, a select delay is imposed before the resulting high logic value may be developed at output line 248.

It may be apparent that during the regeneration mode of operation of motor 10, the enabling logic values at lines 240 and 250 are as described above the represented in FIG. 5. In consequence, the motor 10 is capable of loading energy into the line by causing activation of the logic components opposite the direction of motor rotation until such time as the regeneration is concluded. At that point in operation, the gated drive function as described in conjunction with blocks 64, 80 and 98 is commutated to an off condition.

CROSS-FIRE

The cross-fire function described earlier in conjunction with block 166, again is represented in general in FIG. 3A at 166. Cross-fire function 166 has an input stage constituted as a diode bridge shown generally at 252 which receives an input from line 196 representing an operator control input or the like as well as an input from line 218 representing the voltage value at the armature of motor 10. As a consequence, the bridge 252 serves an ANDing function which provides a voltage output at either or both of lines 254 and 256. As is apparent, the presence of a voltage at these lines 254 and 256 corresponds with an active drive condition at motor 10 or a motor drive input command. The voltage level signal at line 254 is directed through an isolating resistor R11 to the positive input terminal of a buffer 258. Line 254 also is coupled through a level setting resistor R12 to ground. Buffer-comparator 258 transmits the signal from resistor R11 to its output at line 260 and thence through diode D7 to line 262. The output of buffer 258 at line 260 is connected in feedback fashion to the negative input terminal. In similar fashion, line 256 from bridge 252 is directed through resistor R13 to the negative input terminal of inverting amplifier stage 264 having an output at line 266 which is directed through diode D8 to the above-noted line 262. Line 266 is coupled to the negative input terminal of buffer 264 through resistor R27. The positive input terminal of stage 264 is connected to ground through a level setting resistor R28. Thus, buffers 258 and 264 are configured as an absolute magnitude amplifier and a positive signal is applied to line 262 regardless of the output of bridge 252. A stabilizing resistor R14 is coupled from line 262 to ground and line 262 is connected by an input resistor R15 to the negative input terminal of comparator 268. The positive input terminal of comparator 268 is provided with about a +5 v input from line 270, coupled, in turn, to resistor chain R16-R17 connected between +15 v supply and ground.

Figure 3C:
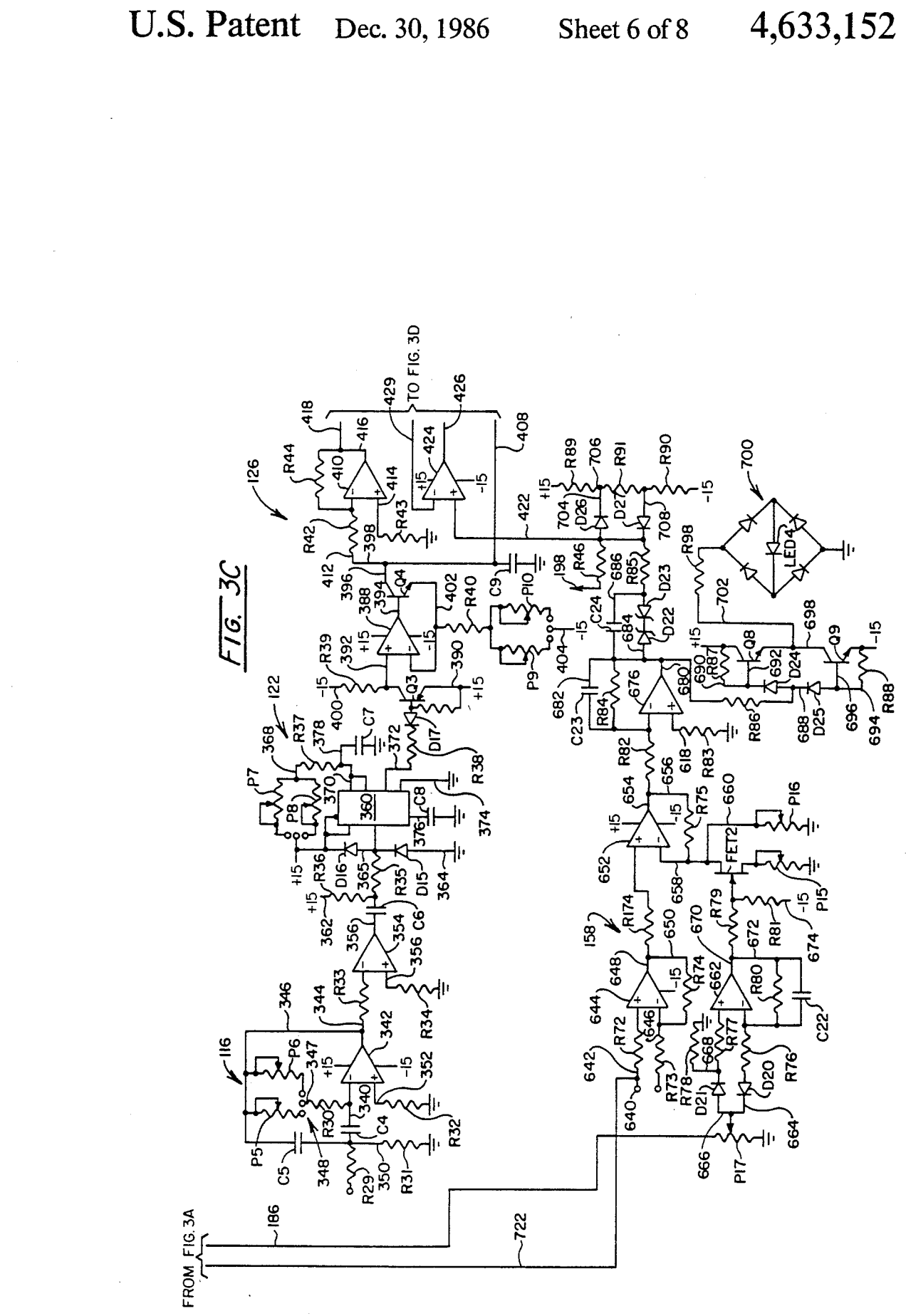
Figure 3D:
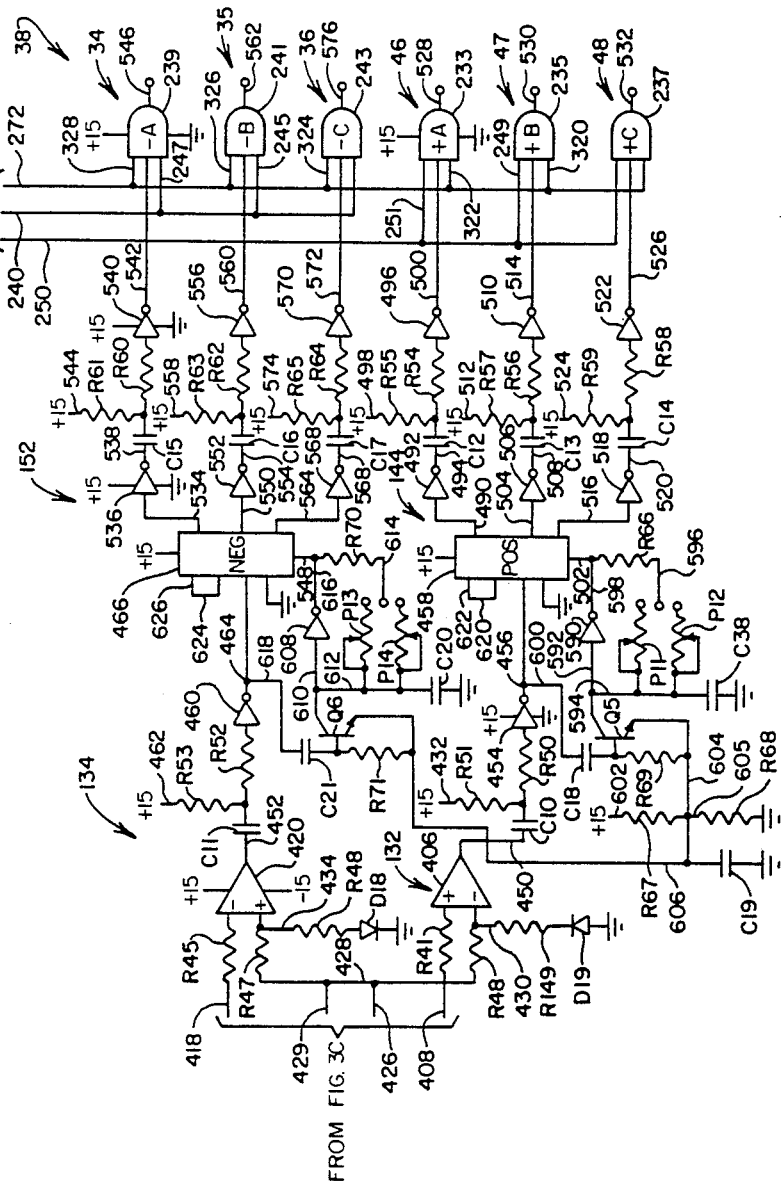

With the arrangement shown, when the voltage level at resistor R15 falls below the pre-established threshold voltage level at line 270, the output of comparator 268 at line 272 will have a logic high value representing a stop or idle condition at motor 10 and no command input signal. This logic high value is impressed through diodes D9 and D10. Diode D9 is positioned within line 272 and extends to line 250 which is connected to the positive phase AND gates 233, 235, 237, while diode D10 is provided within line 274 which extends from line 272 to line 240 which is connected to the negative phase AND gates 239, 241, 243 (FIGS. 3B, 3D). Thus, both of the enablement lines 240 and 250 carry a logic high value signal under the noted cross-fire conditions.

ENABLE NETWORK

The enable network function described in conjunction with block 170 is again represented in general in FIG. 3B at 170. Network 170 includes a plurality of diodes D11-D14, the anodes of which are parallel connected to line 270 which receives a positive 15 volts through a large value resistor R18. Line 270 is connected with an enabling Line 272 which extends to the above-noted positive and negative phase AND gates. line 272 is connected directly to one input of positive C phase AND gate 237; through line 320 to positive B phase AND gate 235; through line 322 to positive A phase AND gate 233; through line 324 to negative C phase AND gate 243; through line 326 to negative B phase AND gate 241 and through line 328 to negative A phase AND gate 239. The third enabling input to the positive phase AND gates 233, 235, 237 and the negative phase AND gates 239, 241, 243 may be provided by a logic high signal at line 270 as conveyed through line 272. This logic high signal is developed by connection of the line with a +15 v. source through large value resistor R18. The logic high value can be maintained, however, only when diodes D11-D14 effectively are back-biased. Each diode D11-D14 monitors an external condition which must be at a predetermined state before a back-biasing logic high value is impressed on its cathode.

A first external condition which is monitored by enable network 170 is line phase. A phase detector represented at block 177 of FIG. 1B but not shown in FIGS. 3A-3D checks each phase of the line power network represented at block 68. Referring to FIG. 3B, if each phase is present and in the proper order, a logic high signal is applied to line 275 which is connected to the base of transistor Q1 through resistor R19. Line 275 may be observed to correspond to line 187 of FIG. 1B. This logic high signal turns transistor Q1 off.

As a consequence, a +15 v supply is asserted along line 276 containing resistor R20 and light emitting diode LED1 to the cathode of diode D14. Diode D14 thus is back-biased and an enabling logic level is permitted at line 270. Note that LED1 will be off. However, a logic low condition at line 275, representing a phase loss will cause transistor Q1 to turn on and couple line 276 to ground. In consequence, the enabling logic high condition at line 270 is lost by conduction through diode D14 and LED1 is turned on.

An input from an external disable switch not shown in FIG. 3B but represented at block 169 in FIG. 1B is connected through line 278 to the cathode of diode D12. When the external disable switch is closed, a logic high signal is applied through line 278 and, conversely, when the external disable switch is open, a logic low condition obtains. This logic low condition removes a normal back biased condition draws enabling line 272 through line 270 to assume a logic low level and thereby disables the positive and negative phase AND gates 233-243.

A motor run switch mounted on the control console of the passenger boarding bridge, represented at block 179 in FIG. 1B and shown generally in FIG. 3B at 179 includes a manual switch serving to selectively close the circuit across terminals 280. Connection of the terminals 280 serves to couple +15 v supply to line 282 which extends, in turn, to the cathode of diode D11, thus back biasing it to retain enabing logic level at line 270. Line 282 also connected to ground through line 284 and line 286 which contains adjusting resistor R20. Line 284 extends through resistor R21 to a light emitting diode LED2 mounted in the boarding bridge control console. When motor run switch 280 is closed, 15 volts are applied to LED2 to turn on the LED. When the motor run switch is open, LED2 is off, the cathode of diode D11 is at a logic low value and a disabling low condition is asserted at AND gates 233-243 as previously described.

An overload network represented at block 178 in FIG. 1B is connected through line 189 to a shunt which produces 500 millivolts output for each 100 amps of armature current and to a source of armature voltage represented at line 26 through line 201. Overload network 178 controls the peak instantaneous motor current and voltage. Network 178 is represented generally at 178 in FIG. 3A. Referring to FIG. 3A, network 178 includes operational amplifier 720 the positive input terminal of which is connected at line 722 through resistor R92 to a current shunt 640 across motor 10 armature shown in FIG. 3C. The output of operational amplifier 720 at line 724 is connected to the winding of potentiometer P18 through line 726 which contains resistor R93. The opposite side of the winding is connected to ground through resistor R94. The wiper arm of potentiometer P18 is connected to the negative input terminal of operational amplifier 720. Capacitor C25 is connected between line 726 and the wiper arm of potentiometer P18. In this configuration operational amplifier 720 is a gain stage. It responds to millivolt signal from current shunt 640 from line 722 at the positive input terminal and multiplies it, and presents the resultant signal at line 724. Line 724 is connected to one side of a diode bridge 728. Overload network 178 looks at the instantaneous voltage, as well as the instantaneous current of the motor. With respect to voltage, the winding of a potentiometer P19 is connected through line 730 to line 186 which represents armature voltage. The wiper arm of potentiometer P19 is connected to the other side of bridge 728 through line 732. Thus, the voltage from the current shunt representing armature current is connected to one input of bridge 728 and the voltage signal representing armature voltage is connected to the opposite side thereof. Resistor R95 which is in line 740 connected between bridge 728 and ground serves as a stabilizing function.

From bridge 728 both of the voltage signals are treated in the same manner. The voltage at lines 724 and 732 inputted to bridge 728 can be positive or negative. If the voltage is positive it is directed to the positive input terminal of operational amplifier 734 through line 736 which contains resistor R94. A negative 15 volt source at line 738 is connected to the positive input terminal of operational amplifier 734 through capacitor C26. The function of the R-C network which includes resistor R94 and capacitor C26 is to filter the input to the positive input terminal. The output of operational amplifier 734 at line 742 is connected in feedback fashion to the negative input terminal thereof through line 744 which contains resistor R96. The negative input terminal of operational amplifier 734 is also connected to bridge 728 through line 744 and line 746 which contains resistor R97. It should be noted that if the output from bridge 728 is positive and is directed to the positive input terminal of operational amplifier 734, the output of amplifier 734 at line 742 is positive. Under this condition the input to the negative input terminal of amplifier 734 from bridge 728 is 0. Thus, under this condition, operational amplifier 734 is functioning as a unity gain amplifier. If the voltage applied to bridge 728 from line 732 or line 724 is negative, a negative voltage is directed from bridge 728 through line 746 to the negative input terminal of operational amplifier 734. Under this condition the input at the positive input terminal of operational amplifier 734 is grounded through resistors R94, R95. As a result, operational amplifier 734 acts as an inverter and a positive voltage is outputted at line 742. Consequently, the output at line 742 from operational amplifier 734 will be a positive voltage regardless of whether the inputs to diode bridge 728 from line 732 representing armature voltage or from line 724 representing armature current are positive or negative.

The output of operational amplifier 734 at line 742 is directed to line 286 which is connected to the gate of a silicon controlled rectifier (SCR) 300 through line 744 which contains resistor R98, a Zener diode D28 and a diode D29. Line 286 is connected to ground through lin 748 which contains resistor R99. Diodes D28 and D29 are arranged such that the voltage signal at line 744 must be greater than 6 volts and positive in order to reach the gate of SCR 300 and turn it on. When an over voltage or over current condition of the motor occurs, a positive voltage greater than 6 volts is applied to Zener diode D28, and sufficient current is supplied to gate SCR 300 on. When so gated, the device will provide a conductive pathe from lines 296 and 284 to ground through diode D51.

A positive 15 volt source is applied through resistor R22 and lines 294 and 284 to the cathode of diode D13 in enable network 170 (FIG. 3B). Such a source is also applied to line 284 through a resistor R23 and light emitting diode LED3. In the event the instantaneous armature voltage exceeds 300 volts or the instantaneous current exceeds 500 amps, SCR 300 is gated on, line 284 is connected to ground as described above and LED3 is turned on to indicate an over voltage or over current situation. In this condition the enabling logic high condition at lines 270 and 272 is lost through conduction through diode D13, lines 284 and 296, and SCR 300 and the positive and negative phase AND gates 233-243 are disabled as previously described.

When the external conditions described above are suitable for operation of the motor, the lines extending to the cathodes of diodes D11-D14 are all at a logic high value, the anodes of these diodes D11-D14 are at a logic high value and a logic high signal, in turn, is applied to the base of transistor Q2 through line 270 and line 288 which contain resistor R24 to turn it off. When transistor Q2 is off, −15 volts is coupled to the gate of a field effect transistor FET1 through resistor R25, line 290, resistor R26 and line 292. A negative voltage at the gate of transistor FET1 turns the device off i.e. causes it to assume an open state. The drain of transistor FET1 is connected through line 208 to the negative input terminal of operational amplifier 180 in the response adjust network (FIG. 3A). If transistor FET1 is closed the input signal at line 16 is grounded through the drain terminal of transistor FET1 and diverted from assertion at operational amplifier 180. Under this condition, there is no command input to the motor control. When transistor FET1 is open, operational amplifier 180 can receive an input command. The function of field effect transistor FET1 is to prevent the input signal from being received by operational amplifier 180 until all of the required external conditions are met. If field effect transistor FET1 did not disable the input to the operational amplifier 180 until after the required external conditions requisite to operation of the motor 10 were met, the response adjust network would be able to enable two of the three inputs to one of the positive or negative groups of AND gates 233-243 and the motor 10 would begin to operate as soon as the third enabling input was received from enabling network 170. This would negate the effect of the response adjust network 20. In other words when field effect transistor FET1 is turned on it delays the operation of the response adjust network until after an enabling input is provided by the enable network 170 to force the motor 10 to respond at the rate set by the response adjust network 20.

PHASE DETECTION

Referring to FIG. 3C, a phase detecting and conditioning function described earlier in conjunction with block 116 in FIG. 1A is again represented generally at 116. In this function a 60 Hz signal from one (A) phase of the line power source represented at block 68 in FIG. 1B is inputted at line 340 in FIG. 3C through resistor R29 and capacitor C4 to the negative input terminal of operational amplifier 342. The output of operational amplifier 342 at line 344 is coupled back to the negative input terminal through line 346 and a resistive-capacitive network indicated at 348. Line 346 is connected in parallel with the wiper arms of a pair of potentiometers P5 and P6. The windings of these potentiometers P5, P6 are connected to terminals such that one of the terminals of one of the potentiometers can be connected to a line 347 which contains resistor R30 and is connected to input line 340. One potentiometer P5 or P6 is selected if the phase input to line 340 is at 50 Hz and the other is selected if the phase input to line 340 is at 60 Hz. Line 346 is also connected to input line 340 through a capacitor C5. Capacitor C5 and potentiometer P5, P6 thus may be seen to comprise resistive capacitive network 348. A low impedance resistor R31 in line 350 is connected between ground and input line 340.

The positive input terminal of operational amplifier 342 is connected to ground through line 352 and resistor R32. This configuration in which the output of operational amplifier 342 is tied to the negative input terminal through the aforementioned resistive capacitive network 348 provides a very narrow band pass filter. It will pass a 50 or 60 Hz signal with a great deal of attenuation to any other signal. Thus, a clean sine wave is supplied at output line 344 through resistor R33 to the negative input terminal of a comparator 354. The positive input terminal of comparator 354 is connected to ground through line 356 which incorporates resistor R34.

The function of comparator 354 is to determine when the input at its negative input terminal goes from positive to negative or from negative to positive. The output of comparator 354 at line 356 is a squarewave which is in exact phase alignment with the input to operational amplifier 342 through line 340. Precise adjustment of the appropriate potentiometer P5 or P6 of network 348 ensures that the cross-over from positive to negative and negative to positive seen at output line 356 of comparator 354 is in exact phase correspondence with the signal input to the negative input terminal of operational amplifier 342 through line 340.

MASTER PHASE DELAY

The squarewave output of comparator 354 at line 356 is directed to a master phase delay network represented at block 122 in FIG. 1A and shown generally at 122 in FIG. 3C. The square wave output of comparator 354 is directed along line 356 through serially connected capacitor C6 and resistor R35 to the trigger input terminal of a type 555 monostable multi-vibrator 360. Monostable multi-vibrator 360 is triggered by a negative going edge, ie. a cross-over from positive to negative at its trigger input. This trigger input to monostable multi-vibrator 360 is held normally high from a +15 volt source asserted through resistor R36 and line 326. To assure that the trigger input to multi-vibrator 360 is maintained between +15 v source and ground, line 365 is coupled by line 364 through diode D15 to ground and through 15 v diode D16 and line 365 to +15 v.

Monostable multi-vibrator 360 provids a time delay corresponding with the phase A firing delay discussed in connection with points 105 and 106 in FIG. 2. To properly establish this delay, an R-C network including potentiometers P7 and P8 is provided which performs in conjunction with resistor R37 and capacitor C7. One or the other of potentiometers P7 or P8 is elected by jumpering depending on the presence of a 50 Hz or 60 Hz system and such selection couples one side of the elected potentiometer to a +15 v source. Correspondingly, capacitor C7 is coupled to ground and to the timing input to multi-vibrator 360 through line 370. A negative leading edge asserted at the trigger input of the monostable multi-vibrator 360 causes capacitor C7 to charge through the resistive network above described. When the voltage at capacitor C7 reaches approximately 10 volts it is discharged through line 378 and line 370 to the timing input of monostable multi-vibrator 360. This causes the output at line 372 to transition to +15 v. which serves as the commencement point or time for initiating a ramp which will be generated as described hereinafter. The output at line 372 remains +15 v until another negative going edge at the trigger input resets monostable multi-vibrator 360. Monostable multi-vibrator 360 is connected to ground through line 374 and to one side of capacitor C8 through line 376. The other side of capacitor C8 is connected to ground. In the instant invention, phase B is activated 120° after phase A is activated and phase C is activated 120° after phase B is activated. This 120° delay for phases B and C is achieved by precisely dividing the time of one phase. Therefore, a separate delay for phases B and C is unnecessary.

RAMP GENERATOR

It may be recalled that the output of the master phase delay 122 is directed to a ramp generator function represented at block 126 in FIG. 1A and indicated generally at 126 on FIG. 3C. This output is that provided at line 372 and extends through resistor R38 and diode D17 to the base of PNP transistor Q3. When multi-vibrator 360 is in its delay period and the output at line 372 is a logic low value or ground, transistor Q3 is drawn on and +15 volts is supplied to the positive input terminal of an operational amplifier 388 through line 390, transistor Q3 lines 400 and 392. The +15 volts at the positive input terminal of amplifier 388 causes the output thereof at line 394 and, consequently, the base of an NPN transistor Q4 to go to a high positive voltage of approximately 15 volts. When this occurs, transistor Q4 acts as a diode and base to collector current flows. This current is directed through line 396 to line 398 which is connected to one side of capacitor C9, the other side of which is connected to ground. Thus, capacitor C9 is caused to charge in a positive direction to +15 volts, where it is held during the entire time of the delay of the monostable multi-vibrator 360. The discharge of capacitor C9 generates a ramp which defines when the line phases can be connected to the motor.

When the monostable multi-vibrator 360 times out, a high (+15 V) signal is applied to the base of transistor Q3 through line 372, resistor R38 and diode D17 to turn the device off. When this occurs a negative 15 volts is directed through line 392 to the positive input terminal of operational amplifier 388 from line 400 which contains resistor R39. This causes the output at line 394 to assume a logic low value, transistor Q4 starts to turn on and capacitor C9 starts to discharge through transistor Q4. However, before transistor Q4 can turn on the voltage at its base, which is connected to line 394, must be approximately 0.6 V more positive than the voltage of its emitter which is connected through line 402 to the negative input terminal of operational amplifier 388. In other words, the emitter of transistor Q4 must be 0.6 volts more negative than its base. The additional negative voltage required at line 402 is received from a negative 15 volt source which is connected to line 402 and the emitter of transistor Q4 through line 404 which contains serially connected resistor R40 and one of a pair of potentiometers P9 or P10. The potentiometer P9 or P10 which is used depends upon whether the signal for which a ramp is being built is at 50 Hz or a 60 Hz. Thus, as transistor Q4 is turned on, capacitor C9 is discharged or charged in a negative direction by the flow of current through line 398, line 396 the collector and emitter of transistor Q4, line 402, resistor R40 and the selected potentiometer P9 or P10 in line 404 to the negative voltage source. The selected potentiometer P9 or P10, adjusts the rate of current flow and hence the rate of discharge of capacitor C9. Thus, the selected potentiometer P9 or P10 establishes the slope of the ramp. Resistors R40 and potentiometer P9 or P10 cause a constant current to flow and thus the discharge of capacitor C9 is completely linear. As previously mentioned, the ramp is generated during the time the output of the monostable multi-vibrator 360 is high. Potentiometers P9 and P10 and resistor R40, which control the flow of current from capacitor C9, are chosen such that the ramp generated by capacitor C9 starts at an initial value of +15 volts and falls to a −5 volt value at the time the ramp is ended.

COMPARATOR

The output of the ramp generator function represented at block 126 in FIG. 1A is divided and one output is directed to one comparator function represented by block 132 and the other output goes to a second comparator function represented at block 134. The signal directed to the input of the comparator function 134 is inverted from that directed to the input of comparator function 132. These comparator functions represented at blocks 132, 134 in FIG. 1A are shown generally at 132 and 134 in FIG. 3D. Looking to the latter figure, the discharge of capacitor C9 is maintained by line 408 which is coupled through resistor R41 to the positive input terminal of a comparator 406. As shown in FIG. 3C, capacitor C9 is connected to the negative input terminal of an inverter 410 through line 398 and line 412 which contains resistor R42. Line 414 and resistor R43 connect the positive input terminal of inverter 410 to ground. The output of inverter 410 at line 416 is coupled in feedback fashion to the negative input terminal thereof through resistor R44 and line 412. Further, the output of inverter 410 is directed to the negative input terminal of comparator 420 through line 416 and line 418 which contains resistor R45.

Thus, the positive input terminal of comparator 406 sees a ramp signal which begins at a +15 volts and decreases in a linear fashion through 0 to −5 volts. At the same time, the negative input terminal of comparator 420 sees a ramp signal which starts at a negative 15 volts and rises through 0 to +5 volts. The two ramps change at the same rate and both pass through 0 at the same time.

The output at line 140 from the response adjust network represented at block 20 in FIG. 1A is directed to another input of each of the comparator functions represented at blocks 132, 134 through lines 136, 138 respectively. Each comparator function 132 and 134 compares its two inputs and then outputs a logic high signal when the the input from the ramp generator function 126 equals the input from the response adjust network 20.

Referring to FIG. 3A, the output of the response adjust network is shown at line 196 which is connected to line 198. Referring to FIG. 3C, line 198 is connected to the positive input terminal of buffer 424 through resistor R46 and line 422. The output of buffer 424 at line 426 is tied in feedback fashion to the negative input terminal through lines 428 and 429 (FIG. 3D), and is connected to the positive input terminal of comparator 420 through line 428 and resistor R47. Line 426, the output of buffer 424 is also connected to the negative input terminal of comparator 406 though line 428 and resistor R48. Line 434 which contains resistor R48 and diode D18 connects the positive input terminal of comparator 420 to ground. Resistors R47 and R48 are sized such that the output at line 426 from buffer 424 that is directed to the positive terminal of comparator 420 is divided by three when it is a positive value. If it is a negative value no division occurs because diode D18 will not conduct. Likewise, line 430 containing resistor R149 and diode D19 is connected between ground and the negative input terminal of comparator 406. Again, resistors R149 and R48 are sized such that the signal at line 426 from buffer 424 which is directed to the negative input terminal of comparator 406 is divided by three when is a negative value. If it is a positive value, no division occurs because diode D19 will not conduct.

Therefore, if the input control is advancing the motor in a forward direction and a positive voltage is applied to the negative input terminal of comparator 406 this input value is undivided and comparator 406 will produce a logic low signal output at line 450 when the voltage of the ramp signal at the positive input terminal reaches the value of the command input at the negative input terminal. At the same time, the positive voltage input is divided by three at the positive input terminal of comparator 420. The output of comparator 420 at line 452 will be a logic low signal when the voltage of the ramp at the negative input terminal reaches the value at the positive input terminal. Since this voltage is one-third the voltage at the negative input terminal of comparator 406 a logic low signal at line 452 will occur after the logic low signal occurs at the output of comparator 406 at line 450.

In a like fashion, if the input control is advancing the motor in a negative direction and a negative voltage is applied to the positive input terminal of comparator 420 this input value is undivided and comparator 420 will produce a logic low signal output at line 452 when the voltage of the ramp signal at the negative input terminal reaches the value of the command input at the positive input terminal. At the same time the negative voltage input is divided by three at the negative input terminal of comparator 406. Thus, a logic low signal will be outputted from comparator 420 at line 452 before a similar output will occur at line 450 from comparator 406.

COUNTERS

Referring to FIG. 1A, it can be seen that the comparator function represented at block 132 controls a positive counter function represented at block 144. Likewise, the comparator function represented at block 134 controls a negative counter function represented at block 152. The counter functions represented at blocks 144, 152 in FIG. 1A are reproduced to generally show these functions at 144, 152 in FIG. 3D. Positive counter function 144 includes counter 458 which is configured as a divide by six counter. The output of comparator 406 at line 450 is connected through capacitor C10 and resistor R50 to the input terminal of inverter 454. The output of inverter 454 at line 456 is connected to the reset input terminal of counter 458. A positive 15 volt source is connected to line 432 which contains resistor R51 and is connected to line 450 between capacitor C10 and resistor R50. Resistor R51 and capacitor C10 function as a differentiator. Consequently, when a logic low signal appears at the output of comparator 406, capacitor C10 discharges and a short duration logic low signal appears at the input of inverter 454. The time period of the logic low signal is set by the value of resistor R51 and capacitor C10 and is preferably 16 to 30 milliseconds. When a logic low signal appears at the input terminal of inverter 454, inverter 454 inverts that input and provide a logic high signal output at line 456 for the same period of time. Thus, a logic high signal is applied to the reset input terminal of counter 458 for 16 to 30 milliseconds when a logic low signal is output at line 450 from comparator 406. Thereafter, a logic high signal is applied to the input of inverter 454 which inverts the input and produces a logic low signal at its output. Similarly, negative counter function 152 includes a counter 466 which is configured as a divide by six counter. The output of comparator 420 at line 452 is connected through capacitor C11 and resistor R52 to the input terminal of inverter 460. The output of inverter 460 at line 464 is connected to the reset input terminal of counter 466. A positive 15 volt source is connected to line 462 which contains resistor R53 and is connected to line 452 between capacitor C11 and resistor R52. Resistor R53 and capacitor C11 function as a differentiator in the same way resistor R51 and capacitor C10 function as previously described. Consequently, when a logic low signal is outputted from comparator 420 at line 452 the logic low signal is applied to the input terminal of inverter 460 for a time period of 16 to 30 milliseconds. When this occurs, inverter 460 inverts the input and outputs a logic high signal at line 464 which is applied to the reset input terminal of counter 466 for the same length of time.

Referring to FIGS. 1A and 1B, it can be seen that the output of the positive counter function 144 is connected to one input of each of the positive phase components 46–48 of activation logic network 38 through line 146–148 and the negative counter function 152 is connected to one input of each of the negative phase components 34–36 of activation logic network 38 through lines 154–156. When the motor is commanded to run in a forward direction, the entire magnitude of the positive input signal at line 428 is received at the negative input terminal of comparator 406 and a logic low signal is applied at line 450 to reset counter 458. The output from counter 458 then determines how far up each waveform, ie. back from the cross-over from positive to negative as shown in FIG. 2, the phase components 46–48 are initiated. At the same time, the positive input signal in line 428 at the positive input terminal of comparator 420 is divided by three as previously described. Consequently a logic low signal is output at line 452 which resets counter 466 after the output at line 450 occurs to reset counter 458. As previously mentioned, counter 466 controls the negative phase components 34–36. Since the motor is being driven forwardly, the negative phase components are enabled down phase, ie. in the positive portion of a phase as shown in FIG. 2 approximately one-third the distance up the positive phase, the positive phase components are actuated. Similarly, if a command input to drive the motor in reverse is supplied from the response adjust network, a negative signal is applied to the negative input terminal of comparator 406 and at the positive input terminal of comparator 420. The entire value of the negative signal at line 428 is inputted to the positive input terminal of comparator 420 and a logic low signal is outputted at line 452 to reset counter 466 to activate the negative phase components at a point in the negative region of the waveform where the ramp signal at the negative input terminal equals the signal at the positive input terminal. At the same time, the negative signal at line 428 is divided by 3 before it is inputted to the negative input terminal of comparator 406. Therefore, a logic low signal is outputted at line 450 subsequent in time to that which was outputted at line 452 from comparator 420. Thus, counter 458 is reset after counter 466 to enable the positive phase components 46–48 in the negative region of the waveforms at a value approximately one-third that at which the negative phase components 34–36 are enabled in the negative region.

From this it can be seen that when either the positive or the negative phase components 46–48, 34–36 of activation logic network 38 are commanded to drive the motor forward or reverse respectively, the opposite phase components are also enabled in the same positive or negative region that the motor is rotating at a voltage approximately one-third that of the phase components which are determining the direction of rotation. The reason for enabling opposite phase components in the same region as the phase components which are setting the direction of rotation of the motor is to enable the opposite set of phase components to absorb power from the motor (regeneration) when the command to the other set of phase components is reduced. In other words, it permits the opposite set of phase components to absorb power from the motor when the motor is running faster than the input command is specifying, i.e. it permits regeneration. This is illustrated graphically in FIG. 5.

As previously mentioned, when a logic low signal is outputted at line 450 from comparator 406 a short duration logic low signal is applied to the input terminal of inverter 454 and a momentary logic high signal is produced at the output at line 456 which is directed to the reset input terminal of counter 458. The logic high signal at the reset terminal immediately resets counter 458 and causes a logic high signal at the output terminal at line 490 which is directed to the input terminal of inverter 492. The output of inverter 492 at line 494 is directed to the input terminal of inverter 496 through a capacitor C12 and a resistor R54. A positive 15 volt source is connected through line 498 and resistor R55 to line 494 between capacitor C12 and resistor R54. Resistor R55 and capacitor C12 function as a differentiator. The output of inverter 496 at line 500 is directed to one input of logic device three input AND gate 233. In operation, the logic high signal output from counter 458 at line 490 is inputted to inverter 492 which inverts the input and outputs a logic low signal to the input of inverter 496. Inverter 496 inverts the input and outputs a logic high signal to AND gate 233. The differentiator circuit components are selected such that the logic low signal which appears at input terminal of inverter 496 has a duration of 16 to 30 milliseconds. Thus, the output of inverter 496 to AND gate 233 is high for the same period of time, i.e. AND gate 233 receives an enabling input for 16-30 milliseconds. Subsequently, a logic high signal is applied to the clock input of counter 458 at line 502 from a timing circuit which will be explained hereinafter. The logic high signal at the clock input increments counter 458 and it outputs a logic high signal at line 504 which is directed to the input terminal of inverter 506.

As noted previously, counter 458 is configured as a divide by six counter and the timing circuit enables the clock input of counter 458 six times during a single line phase to cause it to increment at each 60° of the line phase. Only three outputs of counter 458 are used and the logic high signal at line 504 occurs 120° after the logic high signal was outputted at line 490. As can be seen by referring to FIG. 2, successive line phases are enabled every 120° of a single line phase (A). The output of inverter 506 at line 508 is directed to the input terminal of inverter 510 through capacitor C13 and resistor R56. A positive 15 volt source at line 512 is connected through resistor R57 to line 508 between capacitor C13 and resistor R56. Resistor R57 and capacitor C13 perform a differentiator function as previously described. The output of inverter 510 at line 514 is directed to one input of 3 input AND gate 235. Inverter 506 inverts the logic high signal at its input and outputs a logic low signal at line 508 and at the input terminal of inverter 510. The differentiator circuit causes the logic low signal to last 16 to 30 milliseconds. Inverter 510 inverts the logic low signal at its input and provides a logic high signal at its output at line 514 to one input of 3 input AND gate 235 for 16-30 milliseconds. One hundred twenty degrees after the logic high signal appears at the output at line 504 the timing circuit inputs a logic high signal to the clock input at line 502 which increments counter 458 and causes it to output a logic high signal at line 516 which is directed to the input terminal of inverter 518. The output of inverter 518 at line 520 is connected to the input terminal of inverter 522 through capacitor C14 and resistor R58. A positive 15 volt source at line 524 is connected through resistor R59 to line 520 between capacitor C14 and resistor R58. Resistor R59 and capacitor C14 perform a differentiator function as previously described. The output of inverter 522 at line 526 is directed to one input of logic device 3 input AND gate 237. In operation inverter 518 inverts the logic high signal at its input terminal and outputs a logic low signal at line 520 to the input terminal of inverter 522. Inverter 522 inverts the logic low signal input and outputs a logic high signal at line 526 to AND gate 237 for 16 to 30 milliseconds. The function of the differentiator circuits in the output lines of inverters 492, 506 and 518 is to ensure that an enabling logic high signal of short duration is applied to the input terminal of each of the 3 input AND gates 233, 235, 237. Thus, assuming the other two enabling inputs, one coming from positive phase select line 250 and the other from the external monitoring condition line 272 are held high a logic high signal will appear at the outputs at lines 528, 530, 532 of AND gates 233, 235, 237 respectively for 16 to 30 milliseconds. As previously mentioned, counter 458 is a divide by six counter and since six logic high level pulses are provided at clock input line 502 for each cycle of line frequency each of the six outputs, three of which are shown at 490, 504 and 516, will successively be at a logic high value for 60° of a line phase. It is undesirable to enable the AND gates 233-237 for such a long period of time. Consequently, in order to ensure that the logic high value pulses out of the AND gates 233, 235, 237 are precisely timed and that there are no double pulses the length of time during which the AND gate 233-237 are enabled is made quite short (16-30 milliseconds).

Referring to counter 466, it is identical to counter 458. Thus, a logic high signal at the reset input terminal as a result of a logic low value output at line 452 from comparator 420 resets counter 466 and causes it to output a logic high signal at line 534 which is directed to the input terminal of inverter 536. The output of inverter 536 at line 538 is connected to the input terminal of inverter 540 through capacitor C15 and resistor R60. The output of inverter 540 at line 542 is connected to one input of logic device three input AND gate 239. A positive 15 volt source at line 544 is connected to line 538 through resistor R61 between capacitor C15 and resistor R60. Resistor R61 and capacitor C15 function as a differentiator as previously described. Thus, a logic high value output at line 534 results in a logic high signal enabling input 3 input to AND gate 239 from line 542 for a duration of 16 to 30 milliseconds. As previously mentioned, a logic high signal is applied to the clock input of counter 466 at line 548 at each 60° increment of a cycle of one line phase (A). Two increments or 120° later, a logic high signal is outputted from counter 466 at line 550. Line 550 is directed to the input terminal of inverter 552. The output of inverter 552 at line 554 is directed to the input terminal of inverter 556 through capacitor C16 and resistor R62. A positive 15 volt source supply at line 558 is connected to line 554 between resistor R62 and capacitor C16 through resistor R63. Resistor R63 and capacitor C16 perform the differentiator function described above. The output of inverter 556 at line 560 is connected to one input of logic device three input AND gate 241. Consequently, a logic high value output at line 550 results in a short duration logic high signal enabling AND gate 241. Two increments or 120° into the line phase subsequent to the output at line 550 counter 466 outputs a logic high signal at line 564 which is directed to the input terminal of inverter 566. The output of inverter 566 at line 568 is directed to the input terminal of an inverter 570 through a capacitor C17 and a resistor R64. The output of inverter 570 at line 572 is directed to one input of three input AND gate 243. A positive 15 volt source at line 574 is supplied to line 568 between capacitor C17 and resistor R64 through resistor R65. Resistor R65 and capacitor C17 function as a differentiator as previously described. Consequently, a logic high value output at line 564 results in a short duration logic high signal enabling input to AND gate 243. From the above, it is apparent that each of the counters 458, 466 provide sequential logic high value outputs every 120° of a single phase waveform. These outputs sequentially enable the positive phase and negative phase components of activation logic network 38 at different times or levels in the same positive or negative quadrants of the waveform.

As described above, counters 458 and 456 provide three logic high value outputs spaced 120° apart for each single phase a.c. waveform. They do this because the clock inputs at lines 502, 548, respectively, are enabled by a very high precision oscillator circuit which will now be described. The precision oscillator circuit for counter 458 includes a Schmitt inverter 590 which has an input terminal at line 592 which is connected to ground through line 594 containing capacitor C38. Line 594 is connected to the wiper arms of a pair of potentiometers P11 and P12. The winding of one of the potentiometers P11 or P12 is connected to line 596 which is connected through resistor R66 to the clock input of counter 458 at line 502 and to the output of Schmitt inverter 590 at line 598. Which of the potentiometers P11 or P12 is connected to line 596 is dependent upon whether the control system is operating at 50 Hz or 60 Hz. Operation of the oscillator circuit is as follows. Assuming initially the input terminal of Schmitt inverter 590 at line 592 is at a logic high value, capacitor C38 will initially be charged to a high level of approximately 15 volts. Capacitor C38 will commence to discharge through potentiometer P11 or P12 and resistor R66. The input of Schmitt inverter 590 will remain at a logic high value and the output at a logic low value until the charge of capacitor C38 at its input reaches a signal value of about one-third of the threshold characteristic thereof, the Schmitt inverter 590 having a hysteresis operational characteristic. At the time, the input terminal of Schmitt inverter 590 will immediately assume a logic low value and the output of inverter 590 at 598 will assume a logic high value which will provide an enabling pulse to the clock input 502 of counter 458. This will cause counter 458 to increment and output a logic high signal at another output terminal. Such incrementing occurs every 60° of a single phase waveform. Under these conditions, the logic high value at output line 598 will commence to charge capacitor C38 through resistor R66 and potentiometer P11 or P12 until capacitor C38 reaches two-thirds of the applied voltage, ie. 10 volts. At this time the input terminal of inverter 590 will go to a logic high value and inverter 590 will invert the signal and provide a logic low value at its output at line 598. The cyclic process will continue from this point. The resistor R66, potentiometer P11 or P12 and capacitor C38 are precision components which cooperate with Schmitt inverter 590 to provide a very accurate oscillator circuit. However, if the aforementioned oscillator circuit were allowed to continue for a long period of time it would deviate from synchronization with line frequency. In order to prevent this, the oscillator circuit is reset after every sixth cycle, ie. after each cycle of line frequency. The collector of an NPN transistor Q5 is connected to capacitor C38 through lines 592 and 594. A Line 600 which is connected to the reset input terminal of counter 458 at line 456 is connected to the base of transistor Q5 through capacitor C18 and to line 604 through resistor R69. A positive 15 volt source is connected to line 602 which is connected to the emitter of transistor Q5 through a resistor R67 and line 604. Line 605 which contains resistor R68 connects line 604 to ground. Resistors R67 and R68 act as a voltage divider and are sized such that a +5 volts is present at line 604 which is connected to the emitter of transistor Q5. Line 604 also is connected to one side of capacitor C19 through line 606. The other side of capacitor C19 is connected to ground. Thus, capacitor C19 acts as an energy sink.

The aforementioned oscillator circuit is reset as follows. The logic high signal output from inverter 454 at line 456 to reset counter 458 is applied to the base of transistor Q5 through line 600 and capacitor C18. Capacitor C18 acts as a differentiator in that it is momentarily high to turn on transistor Q5 but quickly discharges through resistor R69. When transistor Q5 is turned on, capacitor C38 is discharged by the flow of current from the collector to the emitter down to the voltage of the emitter which is a positive 5 volts. As previously mentioned, positive 5 volts is the threshold of the negative going characteristic of Schmitt inverter 590. Consequently, the 5 volts provides a logic low value at the input terminal of Schmitt inverter 590 which inverts the signal and provides a logic high signal at its output at line 598 which enables the clock input at line 502 of counter 458. Thus, it can be seen that the clock input receives a pulse at the same time the counter 458 is reset to ensure that the oscillator circuit is in synchronization with line frequency.

A similar oscillator circuit drives counter 466. A Schmitt inverter 608 has an input terminal connected to one side of capacitor C20 through lines 610 and 612. The opposite side of capacitor C20 is connected to ground. Line 612 is connected to the wiper arms of a pair of potentiometers P13 and P14. The winding of one of the potentiometers P13 or P14 is connected to line 614 which directed to the clock input at line 548 of counter 466 through resistor R70. The output of inverter 608 at line 616 is also connected to the clock input at line 548 and to line 614. The aforementioned oscillator circuit functions in the same manner as that which drives counter 458 and its operation will be apparent. One side of capacitor C20 is connected to the emitter of transistor Q6 through lines 612 and 610. The base of transistor Q6 is connected to the reset input terminal of counter 466 at line 464 though line 618 and capacitor C21. The emitter of transistor Q6 is connected to the emitter of transistor Q5 through lines 606 and 604 and is held at +5 volts. The base of transistor Q6 is connected to line 606 through resistor R71. Consequently, a logic high signal at line 464 resets counter 466 and charges capacitor C21 which turns on transistor Q6. When transistor Q6 is on, capacitor C20 discharges down to a +5 volts. Capacitor C21 quickly discharges through resistor R71 to turn off transistor Q6. Thus, each time the counters 458 and 466 are reset, the precision oscillator circuits which increment them are also reset. Therefore, the oscillator circuits only have to run in synchronization for six cycles. This is a safety feature which assures that the signals at the outputs of counters 458 and 466 to AND gates 233-237 and 239-243 are precisely 120° apart. The counters 458, 466 also have an additional safety feature. Referring to counter 458, line 620 connects an output, which would receive the seventh counter pulse if counter 458 were not reset, to an inhibit input at line 622. Consequently, if for some reason counter 458 is not reset at the end of the sixth clock pulse, a seventh pulse will be applied to the inhibit input and counter 458 will stop immediately. Counter 458 will stop even though the oscillator circuit previously mentioned continues to run. In a similar manner, line 624 connects an output, which would receive the seventh counter pulse if counter 466 were not reset, to an inhibit input at line 626. Again, counter 466 will immediately stop running if it is not reset at the end of the sixth clock pulse even though the oscillator circuit providing pulses to the clock input will continue to run.

Referring to FIG. 1A a current limiter function is shown represented at block 158 having an output at line 162 which is directed to the output 140 of the response adjust network represented at block 20. It should be noted that the current limiter output at line 162 is interposed between the output of the response adjust network represented at block 20 and the inputs to the comparators represented at blocks 132, 134. This function monitors the armature current and if the armature current exceeds a set value either when the motor is starting or when it is at operating speed, it reduces the output of the commanded input to a level whereby the armature current does not exceed the set value. Function 158 of FIG. 1A is represented again at 158 in FIG. 3C. The current limiting circuit limits the maximum current to the motor when the motor is stalled to 100 amperes and limits the maximum current to the motor when the motor is at operating speed to 40 amperes. Looking to FIG. 3C the circuit includes a current shunt 640 in series with the motor 10 armature in the form of a section of manganin wire. This shunt has a resistance such that when 100 amperes of current is applied to it, it produces a voltage of approximately 100 millivolts. One end of shunt 640 is connected to line 642 which is directed to the positive input terminal of operational amplifier 644 through resistor R72. The negative input terminal of operational amplifier 644 is connected to the other end of shunt 640 through a line 646 which contains resistor R73. The output of operational amplifier 644 at line 648 is connected in feedback fashion to the negative input terminal thereof through line 650 which contains resistor R74 and line 646. In this configuration, amplifier 644 is a high gain amplifier and resistors R73 and R74 are sized to provide a gain of approximately 10 at the output at line 648. The output of amplifier 644 at line 648 is directed to the positive input terminal of a variable rate amplifier 652 through resistor R174. The output of variable rate amplifier 652 at line 654 is connected to the negative input terminal through line 656 which contains resistor R75 and line 658. Line 658 is connected to the wiper arm of a potentiometer P16 through a line 660, the winding thereof being connected to ground. Potentiometer P16 is adjused to provide a desired gain for variable rate amplifier stage 652 corresponding with a condition wherein the motor is stalled. Line 658 is also connected to the drain of a field effect transistor FET2. The source of transistor FET2 is connected to the wiper arm of potentiometer P15 having a winding which is connected to ground. Potentiometer P15 is adjusted to set the gain of variable rate amplifier 652 when transistor FET2 is turned on, a condition which occurs when the motor is at operating speed.

An input corresponding to armature voltage is supplied to one end of the winding of potentiometer P17 from line 186, the other end of the winding being connected to ground. The wiper arm of potentiometer P17 is connected to the negative input terminal of an absolute magnitude amplifier 662 through line 664 which contains diode D20 and resistor R76. This wiper arm is also connected to the positive input terminal of absolute magnitude amplifier 662 through line 666 which contains diode D21 and resistor R77. A line 668, connected to ground through resistor R78, is connected to line 666 between diode D21 and resistor R77. The output of absolute magnitude amplifier 662 at line 670 is directed to the gate of transistor FET2 through resistor R79. This output is the same whether the voltage input at lines 664 or 666 is positive or negative. The input at line 670 is also connected in feedback fashion to the negative input terminal through line 672 which contains capacitor C22 and line 664. A resistor R80 is inserted in parallel with capacitor C22 in line 672. Resistor R80 and capacitor C22 function as a level adjust-filter combination for amplifier 662. A negative 15 volt source at line 674 is connected through resistor R81 to line 670 at the gate of transistor FET2. This negative voltage ensures that transistor FET2 is off. When the armature voltage exceeds 100 volts, which indicates the motor is at operating speed, a positive voltage is outputted from amplifier 662 at line 670 to turn on transistor FET2. When transistor FET2 is turned on, potentiometer P15 is connected to line 658 in parallel with potentiometer P16. These potentiometers being thus combined, the total resistance between ground and the output of variable rate amplifier 652 at line 654 is reduced from what it is when transistor FET2 is off and potentiometer P16 alone is connected to line 658. This changes the value of the output of variable rate amplifier 652. This output at line 654 is connected to the negative input terminal of an operational amplifier 676 through resistor R82. Operational amplifier 676 has its positive input terminal connected to ground through line 678 which contains resistor R83. The output of operational amplifier 676 at line 680 is connected in feedback fashion to its negative input terminal through line 682 which contains capacitor C23 and line 654. A resistor R84 is inserted in line 682 in parallel with capacitor C23. Resistor R84 and capacitor C23 function as a level adjust-filter combination.

As previously mentioned, the positive input terminal of high gain operational amplifier 644 is connected to current shunt 640 through line 642, the negative input terminal is connected to shunt 640 through line 646. The amplifiers 652 and 676 are adjusted such that when there is a 100 millivolt difference between the positive and negative input terminals of operational amplifier 644, the output of operational amplifier 676 at line 680 will be approximately 13 volts. It should be noted that the circuit is configured such that this voltage will be opposite in polarity to the voltage output of the response adjust network at line 198 which is connected to the positive terminal of buffer 424 through resistor R46 and line 422. The output of operational amplifier 676 at line 680 is also connected to line 422 through line 684 which contains a pair of 12 volt Zener diodes D22 and D23 and a resistor R85. Resistor R85 has approximately half the resistance value of resistor R46 in line 198 which is connected to the output of the response adjust network. If the output of operational amplifier 676 is less than plus twelve volts or greater than minus 12 volts, the motor is not absorbing excessive current and the current limiter circuit is not in operation. Assuming for illustration purposes that there is a negative 13 volts output from operational amplifier 676 at line 680, the 12 volt Zener diodes D22 and D23 will permit a negative 1 volt to be applied to resistor R85. If the voltage from the current limiting circuit just described is negative at line 422, the voltage input from the response adjust network at line 198 through resistor R46 to line 422 will be positive, since the voltage supplied from the current limiter network is always opposite in polarity to that from the response adjust network as previously stated. Additionally, since resistor R85 is one-half the magnitude of resistor R46, a negative 1 volt applied to resistor R85 from the current limiting circuit will have twice the effect of a positive one volt applied to resistor R46 from the response adjust network. In summary, the voltage output from the current limiter network is summed with the voltage output from the response adjust network in a ratio of −2:1 to reduce the magnitude of the input signal from the response adjust network to where the motor is not absorbing excess current. Additionally, the greater the excess current the motor is demanding, the greater the input from the current limiter network to reduce the magnitude of the input signal.

The output of operational amplifier 676 at line 680 is directed through line 682 and resistor R86 to line 688 which is connected to the anode of a Zener diode D24 and the cathode of a Zener diode D25. The cathode of diode D24 is connected to the base of a transistor Q8 through lines 690 and 692. A positive 15 volt source is connected to the collector of transistor Q8 and to the cathode of diode D24 through line 690 which contains resistor R87. The anode of diode D25 is connected to the base of transistor Q9 through lines 694 and 696. A negative 15 volt source is connected to the emitter of transistor Q9 and to the anode of diode D25 through line 694 and resistor R88. The emitter of transistor Q8 is connected to the collector of transistor Q9 through line 698. Line 698 is connected to a diode bridge 700 through line 702 which contains resistor R98. A light emitting diode LED4 is contained in bridge 700. The function of the circuit comprised of bridge 700, light emitting diode LED4, transistors Q8 and Q9 and diodes D24 and D25 is to cause the light emitting diode LED4 to turn on when the current limiting function is reducing the magnitude of the input signal from the response adjust network to buffer 424, the output of which is directed to comparators 406, 420. When there is a voltage output from operational amplifier 676 at line 680, it passes through one of the diodes D24 or D25, depending on its polarity, to turn on one of the transistors Q8 or Q9. When one of the transistors Q8, Q9 is turned on a voltage is applied across bridge 700 to cause light emitting diode LED4 to turn on. Diodes D24 and D25 have a voltage of 22 volts which is significantly greater than that of the 12 volt Zener diodes D22 and D23 in the output of the current limiting circuit. This arrangement is provided inasmuch as it is not desirable to indicate a current limiting situation unless a significant amount of current limiting is occurring.

It will be observed that the anode of a diode D26 and the cathode of a diode D27 are connected to line 422. The cathode of diode D26 is connected to a positive 15 volt source through line 704 and line 706 which contains a resistor R89. The anode of diode D27 is connected to a negative 15 volt source through line 708, line 706 and resistor R90. A resistor R91 separates the points where lines 704 and 708 are connected to line 706. The function of diodes D26 and D27 and resistors R89 and R90 is to limit the boundary of the voltages which can be applied to line 422 to approximately plus or minus 13 volts. In other words, these elements are used for a level adjustment.

Referring to FIG. 1B, the above discussion has described in detail the means for generating each of the three inputs to the positive phase components 46–48 and the negative phase components 34–36 of the activation logic network 38. When the motor 10 is operating, one of the positive or negative A phase components provides an input to coupler network 58, one of the positive or negative B phase components provides an input to coupler network 74 and one of the positive or negative C phase components provides an input to coupler network 92. The inputs to the coupler networks occur sequentially at equally spaced intervals as previously described. Coupler network functions 58, 74, 92 actuate one or the other sides of gated drives represented at blocks 64, 80, 98, respectively, to permit the passage of positive or negative portions of the current phases to the motor armature.

Figure 3E:
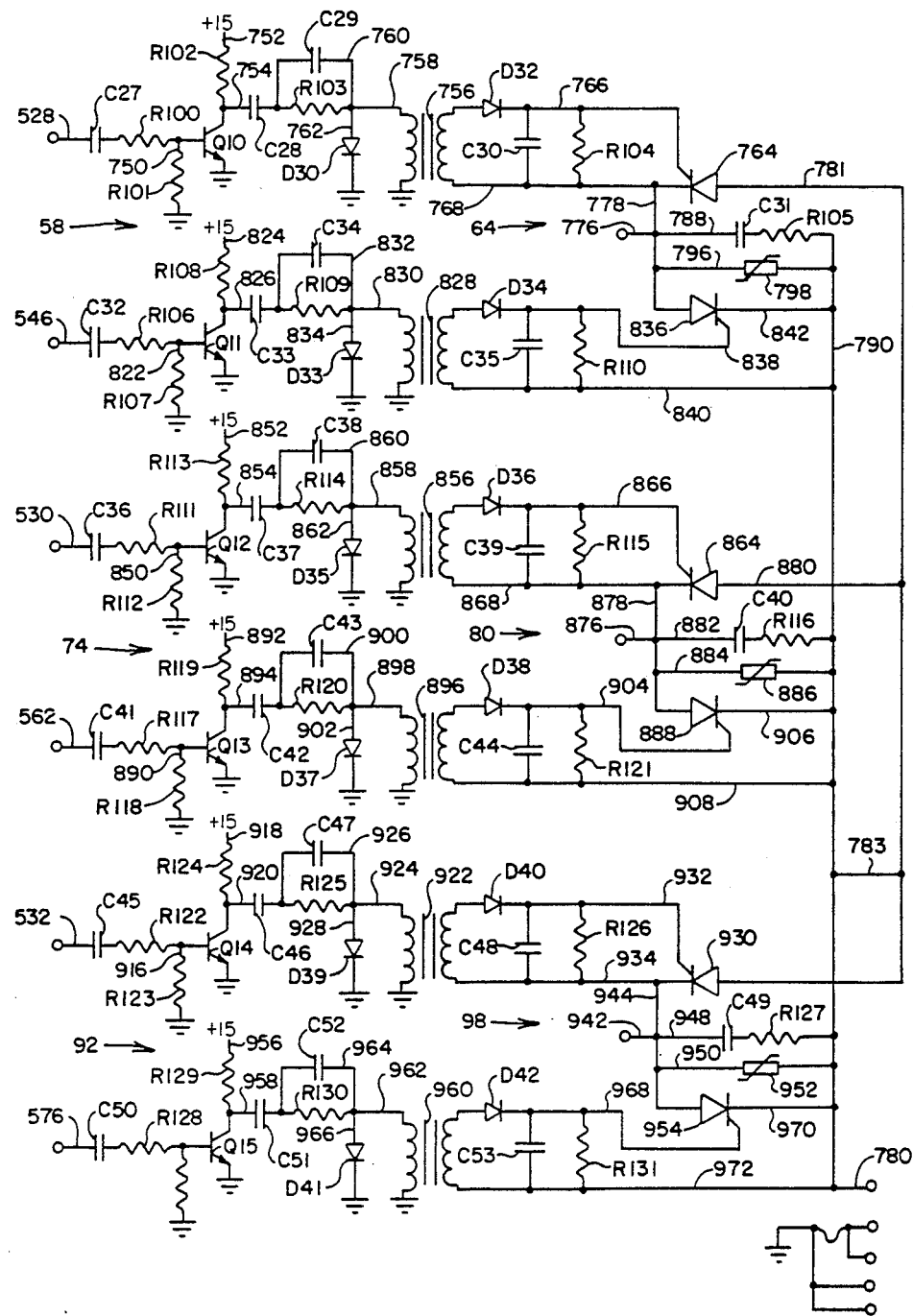
FIG. 3E is a schematic circuit diagram of that portion of the controller circuit which interfaces the three phase line power to the motor armature.

Referring to FIG. 3E, the phase A, phase B and phase C coupler networks 58, 74, 92 are indicated generally by the earlier employed numbers. Likewise, phase A, phase B, and phase C gated drives are indicated generally by numbers 64, 80, 98. Looking momentarily to FIG. 3D, it can be seen that the output of each logic AND gate is directed to an input of one of the coupler networks 58, 74, 92. The output of positive A phase AND gate 233 at line 528 is directed to the base of an NPN transistor Q10 in the positive portion of phase coupler network 58 through capacitor C27 and resistor R100. Line 528 is connected to ground through line 750 and resistor R101. A positive 15 volt source is directed to the collector of transistor Q10 through line 752 which contains resistor R102 and to the positive side of capacitor C28 through lines 752 and 754. The negative side of capacitor C28 is connected to one side of the primary winding of a transformer 756 through resistor R103 and line 758, while the other side of the primary winding is connected to ground. Capacitor C29 is contained in line 760 which is connected to line 758 in parallel with resistor R103. Line 762 which contains diode D30 having its cathode connected to ground is connected to line 758. The output of the positive portion of phase A coupler network 58 is received by the positive portion of phase A gated drive 64 which contains the secondary winding of transformer 756. This secondary winding is coupled through diode D32 to the gate of silicon controlled rectifier (SCR) 764 through line 766. The opposite side of the secondary winding is connected to the cathode or SCR 764 through line 768. A capacitor C30 and resistor R104 are seen to be coupled between lines 766 and 768. The cathode of SCR 764 is connected to the line phase A input at line 776 through lines 768 and 778. The anode of SCR 764 is connected to the motor armature at line 780 through lines 781, 783 and 790. Line phase A input at line 776 also is connected to the motor armature at line 780 through line 788 which contains capacitor C31 and resistor R105, and line 790. Capacitor C31 and resistor R105 function as a snubber which limits the rate of rise of voltage from the line phase A input at line 776 to prevent damage to SCR 764. The line phase A input at line 776 is also connected to the motor armature at line 780 through line 796 which contains metal oxide varistor 798 and line 790. Metal oxide varistor 798 limits the peak maximum voltage which can be inputted by line phase A to thereby further protect SCR 764.

Operation of the positive portions of phase A coupler network 58 and phase A gated drive 64 to turn on SCR 764 and permit a portion of the line phase A input at line 776 to pass to the motor armature at line 780 as a result of a pulse out of AND gate 233 will now be described. When all of the inputs of positive A phase AND gate 233 are a logic high value AND gate 233 outputs a logic high signal at line 528 which is applied to the base of transistor Q10 to turn that device on. The duration of that pulse is approximately 400 microseconds. When transistor Q10 is turned on, its collector and the positive side of capacitor C28 go from positive 15 volts to 0 volts. At the same time the negative side of capacitor C28 goes to negative 15 volts as do both sides of capacitor C29. The rapid change of voltage in capacitor C29 causes the top of the primary winding of transformer 756 to go to negative 15 volts while the bottom of the winding is at 0 volts. This negative voltage difference is inverted at the secondary winding of transformer 756 and passes through diode D32 to charge capacitor C30.

Capacitor C30 passes current to the gate of SCR 764 to turn that device on. Subsequent to the relatively high voltage, short duration, first pulse which turns SCR 764 on, capacitor C28 discharges through resistor R103 and the primary winding of transformer 756 at a relatively constant rate. This causes a changing waveform across the primary winding of the transformer 756 which passes to the secondary winding and through diode D32 to charge capacitor C30. This occurs until capacitor C28 is completely discharged. During the time capacitor C28 is discharging approximately 2 volts is passed across transformer 756 to charge capacitor C30. This energy transfer is of considerably less magnitude and longer duration than the initial transfer which was about 10 volts for approximately 10 microseconds which turned SCR 764 on. The transfer of a relatively high level of energy for a short time followed by a lesser level for a longer time is desirable to maximize the life of SCR 764. In the circuit, resistor R104 will discharge capacitor C30 if any energy remains in it after capacitor C28 is discharged. SCR 764 remains on until the positive portion of the line phase input at line 776 drops to 0. Before the positive portion of line phase A drops to 0, the positive portion of line phase B will be supplied to the motor armature when the positive portion of B phase coupler network 74 and the positive portion of phase B gated drive 80 are sequentially actuated by the output of a pulse from the AND gate 235. Before the positive portion of the line phase B input falls to 0, the positive portion of phase C coupler network 92 and phase C gated drive 98 are actuated to provide a phase C line input to the motor armature by the output of a logic high from AND gate 237.

Line 546 at the output of negative A phase AND gate 239 is directed to the base of an NPN transistor Q11 in the negative portion of phase A coupler network 58 through capacitor C32 and resistor R106. Line 546 is connected to ground through line 822 and resistor R107. A positive 15 volt source is connected to the collector of transistor Q11 through line 824 which contains resistor R108 and to the positive side of capacitor C33 through lines 824 and 826. The negative side of capacitor C33 is connected to the primary winding of a transformer 828 through resistor 109 and line 830 while the other side of the winding is connected to ground. Line 832 which contains capacitor C34 is connected to line 830 in parallel with resistor R109. Line 834, which contains diode D33 having its cathode connected to ground, is connected to line 830. The output of the negative portion of phase A coupler network 58 at the primary winding of transformer 828 is received by the negative portion of phase A gated drive 64 which contains the secondary winding of transformer 828. This secondary winding is coupled through diode D34 connected to the gate of silicon controlled rectifier (SCR) 836 through line 838. The opposite side of the winding is connected to the cathode of SCR 836 through lines 840, 790, and 842. A capacitor C35 and resistor R110 are coupled between lines 838 and 840. The anode of SCR 836 is connected to the line phase A input at line 776 through line 778, while its cathode is connected to the motor armature at line 780 through lines 790. SCR 836 is protected from high voltage peaks by varistor 798 and from rapid voltage changes by a snubber network which is comprised of capacitor C31 and resistor R105 in the same manner that SCR 764 is protected. The negative portion of phase A coupler network 58 and the negative portion of phase A gated drive 64 function in the same way as their positive counterparts when a pulse is received at the base of transistor Q11.

The output of logic device positive B phase AND gate 235 at line 530 is directed to the base of an NPN transistor Q12 in the positive portion of phase B coupler network 74 through capacitor C36 and resistor R111. Line 530 is connected to ground through resistor R112 and line 850. A positive 15 volt source is connected to the collector of transistor Q12 through line 852 which contains resistor R113 and to the positive side of capacitor C37 through lines 852 and 854. The negative side of capacitor C37 is connected to one side of the primary winding of a transformer 856 through resistor R114 and line 858, while the other side of the winding is connected to ground. Line 860, which contains capacitor C38, is connected to line 858 in parallel with resistor R114. Line 862 which contains diode D35 having its cathode connected to ground is connected to line 858. The output of the positive portion of phase B coupler network 74 at the primary winding of transformer 856 is received by the positive portion of phase B gated drive 80 which contains the secondary winding of transformer 856. This secondary winding is coupled through diode D36 to the gate of silicon controlled rectifier SCR 864 through line 866. The cathode of SCR 864 is connected to the opposite side of the secondary winding through line 868. A capacitor C39 and resistor R115 are coupled between lines 866 and 868. The cathode of SCR 864 is connected to the line input of phase B at line 876 through lines 868 and 878. The anode of SCR 864 is connected to the motor armature at line 780 through lines 880, 781, 783 and 790. Phase B line input at line 876 is connected to the motor armature at line 780 through line 882 which contains snubber network components capacitor C40 and resistor R116. This input is also connected to the motor armature through line 884 which contains metal oxide varistor 886. Line phase B input at line 876 is also connected to the anode of a second silicon controlled relay (SCR) 888 through line 878. Metal oxide varistor 886 limits the peak voltage which can be seen by SCRs 864 and 888. The snubber network limits the rate of voltage change which can be seen by SCRS 864 and 888 as discussed above.

The output of logic device negative B phase AND gate 241 at line 562 is directed to the base of an NPN transistor Q13 in the negative portion of phase B coupler network 74 through capacitor C41 and resistor R117. Line 562 is connected to ground through line 890 and resistor 118. A positive 15 volt source is connected to the collector of transistor Q13 through line 892 which contains resistor R119 and to the positive side of capacitor C42 through lines 892 and 894. The negative side of capacitor C42 is connected to one side of the primary winding of a transformer 896 through resistor R120 and line 898, while the other side of the primary winding is connected to ground. Line 900, which contains capacitor C43, is connected to line 898 in parallel with resistor R120. Line 902, which contains diode D37 having its cathode connected to ground, is connected to line 898. The output of the negative portion of phase B coupler network 74 at the primary winding of transformer 896 is received by the negative portion of phase B gated drive 80 which contains the secondary winding of transformer 868. This secondary winding is coupled through diode D38 to the gate of silicon controlled rectifier (SCR) 888 through line 904. The cathode of SCR 888 is connected to the opposite side of the secondary winding of transformer 896 through lines 906, 790 and 908. A capacitor C44 and resistor R121 are coupled between lines 904 and 908. The anode of SCR 888 is connected to the line input of phase B at line 876 through line 878. The cathode of SCR 888 is connected to the motor armature at line 780 through lines 906 and 790.

The output of positive C phase AND gate 237 at line 532 is directed to the base of an NPN transistor Q14 in the positive portion of phase C coupler network 92 through capacitor C45 and resistor R122. Line 532 is connected to ground through resistor R123 and line 916. A positive 15 volt source is connected to the collector of transistor Q14 through line 918 which contains resistor R124 and to the positive side of capacitor C46 through lines 918 and 920. The negative side of capacitor C46 is connected to one side of the primary winding of a transformer 922 through line 924 which contains resistor R125, while the other side of the winding is connected to ground. Line 926 which contains capacitor C47 is connected to line 924 in parallel with resistor R125. Line 928 which contains diode D39 having its cathode connected to ground is connected to line 924. The output of the positive portion of phase C coupler network 92 at the primary winding of transformer 922 is received by the positive portion of phase C gated drive 98 which contains the secondary winding of transformer 922. This secondary winding of transformer 922 is coupled to the gate of silicon controlled rectifier (SCR) 930 through diode D40 and line 932. The cathode of SCR 930 is connected to the secondary winding through line 934. A capacitor C48 and resistor R126 are coupled between lines 932 and 934. The cathode of SCR 930 is connected to the phase C line input at line 942 through lines 934 and 944, while the anode thereof is connected to the armature motor at line 780 through lines 781, 783 and 790. Phase C line input at line 942 is connected to the motor armature through line 948 which contains capacitor C49 and resistor R127. This input is also connected to the motor armature at line 780 through line 950 which contains metal oxide varistor 952. The line phase C further is directed to the anode of a silicon controlled rectifier (SCR) 954 through line 944. Capacitor C49 and resistor R127 function as a snubber, as previously described in connection with phases A and B, to reduce the rate at which the phase C line input voltage rises, to protect SCRs 930 and 954. Additionally, metal oxide varistor 952 limits the peak voltages which can be seen by the SCRs 930 and 954.

The output of logic device negative C phase AND gate 243 at line 576 is directed to the base of an NPN transistor Q15 in the negative portion of phase C coupler network 92 through capacitor C50 and resistor R128. A positive 15 volt source is directed to the collector of transistor Q15 through line 956 which contains resistor R129 and to the positive side of capacitor C51 through lines 956 and 958. The negative side of capacitor C51 is connected to one side of the primary winding of a transformer 960 through line 962 which contains resistor R130, while the other side of the winding is connected to ground. Line 964, which contains capacitor C52, is connected to line 962 in parallel with resistor R130. The output of the negative portion of phase C coupler network 92 at the primary winding of transformer 960 is received by the negative portion of phase C gated drive 98 which contains the secondary winding of transformer 960. This winding is coupled through diode D42 to the gate of SCR 954 through line 968. The cathode of SCR 954 is connected to the other side of the winding through lines 970, 790 and 972. A capacitor C53 and resistor R131 are coupled between lines 968 and 972. The cathode of SCR 954 is connected to the motor armature at line 780 through lines 970 and 790. As in the case of phases A an B, when a pulse is outputted at one of the AND gates 237 or 243 connected to the positive and negative portions of the phase C coupler network 92, the portion of the coupler network which has been actuated cooperates with the same positive or negative portion of the phase C gated drive 98 to turn on one of the SCRs 930 or 954 to permit the passage of a portion of the positive or negative half of the phase C line input to the motor armature.

Since certain changes may be made in the above-described system, apparatus, and method without departing from the scope of the invention herein, it is intended that all matter contained in the description thereof or shown in the accompanying drawings shall be interpreted as illustrative and not in a limiting sense.

I claim:

1. A control circuit for controlling the operation of a direct current motor by select application of a three phase alternating current line input of given frequency to the armature thereof through solid-state forward and reverse designated switches selectively gated by phase responsive gate signals comprising:
   command means for providing command signals of polarity and value corresponding with a selected direction and speed;
   armature responsive means for deriving armature signals corresponding with the instantaneous value of voltage applied to said armature;
   forward enable logic means for providing said forward gate signals in the presence of predetermined forward enable inputs for gating said forward designated switches;
   reverse enable logic means for providing said reverse gate signals in the presence of predetermined reverse enable inputs for gating said reverse designated switches;
   first input stage means for comparing said command signals and said armature signals and for providing an output representing the difference therebetween;
   integrator stage means responsive to said first input stage means output and having a select time constant for deriving a response adjusted output with a polarity defining directional characteristic;
   mixing means for directing select portions of said armature signals and said response adjusted output in common to said first input stage means; and
   directional comparator means for receiving said response adjusted output and said armature signals and responsive to forward and reverse conditions thereof to provide a first of said forward enable inputs in the presence of said forward conditions and to provide a first of said reverse enable inputs in the presence of said reverse conditions.

2. The control circuit of claim 1 in which:
   said circuit includes decoupling means responsive to the output of said integrator stage means to provide a deadband such that changes in said response adjusted output are not input to said mixing means when said response adjusted output is substantially equal in magnitude to the input to said first input stage means derived from the output of said mixing means.

3. The control circuit of claim 1 in which:

said circuit includes time constant adjusting means which receives said output of said first input stage means and adjusts the value of said select time constant to thereby set the rate at which said response adjusted output responds to changes in said command signals.

4. The control circuit of claim 1 in which:

said mixing means is responsive to said armature signals and to said response adjusted output to provide an output representing a ratio of said armature signals to said response adjusted output; and said mixing means includes mix adjusting means for changing said ratio of said armature signals to said response adjusted output which is directed to said first input stage means.

5. The control circuit of claim 1 in which:

said circuit includes reverse delay netwok means for delaying the receipt of one of the first said forward enable input by said forward enable logic means or the first said reverse enable input by said reverse enable logic means when said directional comparator means provides said one of the first said forward enable input or the first said reverse enable input to cause the motor to change direction of rotation or to decelerate in the same direction to thereby prevent simultaneous forward and reverse gate signals; and reverse delay by-pass means to allow the first said forward enable input to pass to said forward enable logic means or to allow the first said reverse enable input to pass to said reverse enable logic means without incurring the delay of said reverse delay network means when said directional comparator means provides the first said forward enable input or the first said reverse enable input to cause the motor to maintain a constant speed or to accelerate in the same direction of rotation.

6. The control circuit of claim 1 in which:

said circuit includes absolute magnitude amplifier stage means responsive to said armature signals and said response adjusted output for deriving a motor activity signal; and threshold responsive means responsive to said motor activity signal and a predetermined threshold input to simultaneously effect the first said forward enable input to said forward enable logic means and the first said reverse enable input to said reverse enable logic means when the magnitude of said motor activity signal is less than the magnitude of said predetermined threshold input.

7. The control circuit of claim 1 in which:

said circuit includes external monitoring means for monitoring the states of specified external functions and for providing monitoring signals corresponding with the presence or absence of a predetermied state of each of said specified external functions; and enable network means responsive to said monitoring signals to simultaneously output a second said forward enable input to said forward enable logic means and a second said reverse enable input to said reverse enable logic means when said monitoring signals indicate all of said specified external functions are in a predetermined state.

8. The control circuit of claim 7 in which:

said circuit includes disable means responsive to the output of said enable network means to disable the command signal input to the said first input stage means until said enable network means outputs said second forward enable input and said second reverse enable input.

9. The control circuit of claim 1 in which:

said response adjusted output includes a motor speed defining characteristic;

said circuit includes ramp circuit means responsive to one phase of said three phase line input to derive select phase conditioned ramp signals;

said circuit includes speed comparator means for receiving said select phase conditioned ramp signals and said response adjusted output and responsive to speed conditions thereof derives a phase conditioned output with a speed defining characteristic; and said circuit includes counter means responsive to said phase conditioned output to provide a sequential, phase responsive, third of said forward enable inputs to said forward enable logic means and a sequential, phase responsive, third of said reverse enable inputs to said reverse enable logic means.

10. The control circuit of claim 9 in which:

said ramp circuit means includes phase delay means for receiving one phase of said three phase line input and having a select time delay derives a phase aligned output corresponding with the earliest possible derived power implementation of one phase of said three phase input.

11. The control circuit of claim 10 in which:

said ramp circuit means includes ramp generating means for receiving said phase aligned output and initiating said phase conditioned ramp signals simultaneous with the receipt of said phase aligned output.

12. The control circuit of claim 9 in which:

said control circuit includes incrementing means responsive to said phase conditioned output for incrementing said counter means to thereby cause said counter means to provide three equally spaced counter outputs which comprise said third of said forward enable inputs and said third of said reverse enable inputs.

13. The control circuit of claim 1 in which:

said control circuit includes armature responsive means for deriving armature signals corresponding with the instantaneous value of current applied to said armature;

current limiter network means for receiving said armature signals and providing an output representing armature current of said armature current exceeds a limit value;

means responsive to said current limiter network output to provide a second current limiter network output of opposite polarity; and summing means responsive to the sum of said comand network means output and said second current limiter network output to reduce the magnitude of said command network means output when armature current exceeds said reference value.

14. The control circuit of claim 1 in which:

said forward gate signals sequentially gate said forward and reverse designated switches in the same negative or positive region of line power during operation of the motor to enable the motor to regenerate power to the line when said response adjusted input calls for the motor to decrease speed or change direction.

15. A control circuit for controlling the operation of a direct current motor by select application of a three phase line input of given frequency to the armature thereof through gatable solid-state forward and reverse designated switches comprising:

command network means for providing a direction and rate output in response to a command input;

filter means for receiving a single phase input from said line and providing a time varying output in a correspondence therewith;

phase delay means responsive to said time varying output for providing a phase delay output corresponding with the commencement of derived power implementation of one phase of said three phase input;

ramp network means for commencing the generation of a select first ramp signal in response to said phase delay output;

means for generating a select second ramp signal corresponding to and simultaneously with said select first ramp signal;

rate comparator means responsive to said first and said second ramp signals and to said command network means output for deriving corresponding first and second phase responsive operation signals;

oscillator means for providing precision time varying output corresponding with said line frequency;

counter means responsive to said first and said second phase responsive operation signals and said precision time varying output and commencing the mutually timed sequential provision of three phase designated forward gate signals and three phase designated reverse gate signals;

forward enable logic means responsive to each discrete said forward gate signals for selectively gating said forward designated switches; and reverse enable logic means responsive to each discrete of said reverse gate signals for selectively gating said reverse designated switches.

16. The control circuit of claim 15 in which:
said select second ramp generating means includes inverter means for receiving said select first ramp signal and providing said second ramp signal; and
said select second ramp signal is equal in magnitude and opposite in polarity to said select first ramp signal.

17. The control circuit of claim 15 in which:
said rate comparator means includes a first rate comparator means responsive to said first ramp signal and said command network means to derive said first phase responsive operation signals and a second comparator means responsive to said second ramp signal and said command network means to derive said second phase responsive operation signal.

18. The control circuit of claim 17 in which:
said circuit includes divider means responsive said command network means to reduce the magnitude of said command network means output to one of said first or said second rate comparator means when said command network means output is positive and to reduce the magnitude of said command network means to the other of said first or second rate comparator means when said command network means output is negative.

19. The control circuit of claim 15 in which:
the time varying output of said precision oscillator means is six times line frequency; and
said precision oscillator means includes reset means responsive to said first and said second phase responsive operation signals to reset said precision oscillator means once for each cycle of line frequency to lock said time varying output in correspondence with said first and said second phase responsive operation signals.

20. The control circuit of claim 15 in which:
said counter means includes a first counter means responsive to said first phase responsive operation signal and said precision time varying output to provide said three phase designated forward gate signals and a second counter means responsive to said second phase responsive operation signal and said precision time varying output to provide said three phase designated reverse gate signals;

said first counter means includes a first counter reset means responsive to said first phase responsive operation signal to recommence said mutually timed, sequential provision of three phase designated forward gate signals; and said second counter means includes a second counter reset means responsive to said second phase responsive operation signal to recommence said mutually timed, sequential provision of three phase designated reverse gate signals.

21. The control circuit of claim 20 in which:
said precision oscillator means includes a first precision oscillator means to provide a first precision time varying output to said first counter means and a second precision oscillator means to provide a second precision time varying output to said second counter means;

said first precision oscillator means includes a first oscillator reset means responsive to said first phase responsive operation signal to recommence said first precision time varying output;

said second precision oscillator means includes a second oscillator reset means responsive to said second phase responsive operation signal to recommence said second precision time varying output; and said first phase responsive operation signal simultaneously enables said first counter reset means and said first oscillator reset means and said second phase responsive operation signal simultaneously enables said second counter reset means and said second oscillator reset means.

22. The control circuit of claim 21 in which:
said first and said second precision time varying output is six times line frequency;

said first and said second phase responsive operation signals enable said first counter means and said second counter means, respectively, once during each cycle of line frequency;

said first counter means includes a first counter inhibit means responsive to said first precision time varying output to interrupt operation of said first counter means if more than six outputs are received from said first precision time varying output before said first phase responsive operation signal enables said first counter reset means; and said second counter means include a second counter inhibit means responsive to said second precision time varying output to interrupt operation of said second counter means if more than six outputs are received from said second precision time varying output before said second phase responsive operation signal enables said second counter set means.

23. The control circuit of claim 15 in which:
said circuit includes armature responsive means for deriving armature signals corresponding with the instantaneous value of voltage applied to said armature; and
directional comparator means for receiving said command signals and said armature signals and responsive to forward and reverse conditions thereof to provide a second forward gate signal and a second reverse gate signal.

24. The control circuit of claim 23 in which:
said circuit includes external monitoring means for monitoring the state of specified external functions and for providing monitoring signals indicating the presence or absence of a predetermined state of each of said specified external functions; and
enable network means responsive to said monitoring signals to simultaneously provide a third forward gate signal and a third reverse gate signal when all of said monitoring signals indicate each of said specified external functions is in a predetermined state.

25. The control circuit of claim 15 in which:
said control circuit includes armature responsive means for deriving armature signals corresponding with the instantaneous value of current applied to said armature;
current limiter network means for receiving said armature signals and providing an output representing armature current if said armature current exceeds a limit value;
means responsive to said current limiter network output to provide a second current limiter network output of opposite polarity; and
summing means responsive to sum said command network means output and said second current limiter network output to reduce the magnitude of said command network means output when armature current exceeds said limit value.

26. The control circuit of claim 25 in which:
said current limiter network means includes set means for providing a first current limit value corresponding to a motor stopped condition and a second current limit value corresponding to a motor operating condition;
second armature responsive means for deriving second armature signals corresponding with the instantaneous value of voltage applied to said armature; and
absolute magnitude amplifier stage means responsive to said second armature signals to actuate said set means to provide said second current limit value when the motor reaches said set operating condition.

27. The control circuit of claim 15 in which:
said forward gate signals sequentially gate said forward and said reverse designated switches in the same negative or positive region of line power during operation of the motor to enable the motor to regenerate power to the line when said response adjusted input calls for the motor to decrease speed or change direction.

28. A control circuit for controlling the operation of a direct current motor by select application of a three phase line input of given frequency to the armature thereof through gatable solid-state forward and reverse designated switches comprising:
command network means for providing a direction and rate output in response to a command input;
armature responsive means for deriving armature signals corresponding with the instantaneous value of voltage applied to said armature;
forward enable logic means for providing said forward gate signals in the presence of predetermined forward enable inputs for gating said forward designated switches;
reverse enable logic means for providing said reverse gate signals in the presence of predetermined reverse enable inputs for gating said reverse designated switches;
first input stage means responsive to compare said command signals and said armature signals and for providing an output representing the difference therebetween;
integrator stage means responsive to said first input stage means output and having a select time constant for deriving a response adjusted output with a polarity defining directional characteristic;
directional comparator means for receiving said response adjusted output and said armature signals and responsive to forward and reverse conditions thereof to provide a first of said forward enable inputs to said forward enable logic means in the presence of said forward conditions and to provide a first of said reverse enable inputs to said reverse enable logic means in the presence of said reverse conditions;
filter means for receiving a single phase input from said line and providing a time varying output in correspondence therewith;
phase delay means responsive to said time varying output for providing a phase delay output corresponding with the commencement of derived power implementation of one phase of said three phase input;
ramp network means for commencing the generation of a select first ramp signal in response to said phase delay output;
means for generating a second ramp signal corresponding to and simultaneously with said first ramp signal;
rate comparator means responsive to said first and second ramp signals and to said command network means output for deriving corresponding first and second phase responsive operation signals;
oscillator means for providing a precision time varying output corresponding with said line frequency;
counter means responsive to said first phase responsive operation signal and said precision time varying output and commencing the mutually timed sequential provision of three phase designated forward gate signals and responsive to said second phase responsive operation signal and said precision time varying output and commencing the mutually timed sequential provision of three phase designated reverse gate signals;
said forward enable logic means being responsive to each discrete said forward gate signals for selectively gating said forward designated switches; and
said reverse enable logic means being responsive to each discrete reverse gate signals for selectively gating said reverse designated switches.

29. The control circuit of claim 28 in which:

said rate comparator means includes a first rate comparator means responsive to said first ramp signal and said command network means output to derive said first phase responsive operation signal and a second rate comparator means responsive to said second ramp signal and said command network output to derive said second phase responsive operation signal.

30. The control circuit of claim 29 in which:
said circuit includes divider means responsive to said command network means output to reduce the magnitude of said command network means output to said first rate comparator means when said command network means output is one polarity and to reduce the magnitude of said comand network means output to said second rate comparator means when said command network means output is the opposite polarity.

31. The control circuit of claim 28 in which:
said counter means includes a first counter means responsive to said first phase responsive operation signal and said precision time varying output to provide said three phase designated forward gate signals and a second counter means responsive to said second phase responsive operation signal and said precision time varying output to provide said three phase designated reverse gate signals;
said first counter means includes a first counter reset means responsive to said first phase responsive operation signal to recommence said mutually timed sequential provision of three phase designated forward gate signals; and
said second counter means includes a second counter reset means responsive to said second phase responsive operation signal to recommence said mutually timed, sequential provision of three phase designated reverse gate signals.

32. The control circuit of claim 31 in which:
said precision oscillator means includes a first precision oscillator means to provide a first precision time varying output to said first counter means and a second precision oscillator means to provide a second precision time varying output to said second counter means;
said first precision oscillator means includes a first oscillator reset means responsive to said first phase responsive operation signal to recommence said first precision time varying output;
said second precision oscillator means includes a second oscillator reset means responsive to said second phase responsive operation signal to recommence said second precision time varying output; and
said first phase responsive operation signal simultaneously enables said first counter reset means and said first oscillator reset means and said second phase responsive operation signal simultaneously enables said second counter reset means and said second oscillator reset means.

33. The control circuit of claim 32 in which:
said first and second precision time varying output is six times line frequency;
said first and said second phase responsive operational signals enable said first counter means and said second counter means, respectively, once during each cycle of line frequency;
said first counter means includes a first counter inhibit means responsive to said first precision time varying output to interrupt operation of said first counter means if more than six outputs are received from said first precision time varying output before said first phase responsive operation signal enables said first counter reset means; and
said second counter means include a second counter inhibit means responsive to said second precision time varying output to interrupt operation of said second counter means if more than six outputs are received from said second precision time varying output before said second phase responsive operation signal enables said second counter reset means.

34. The control circuit of claim 28 in which:
said circuit includes external monitoring means for monitoring the states of specified external functions and for providing monitoring signals corresponding with the presence or absence of a predetermined state of each of said specified external functions; and
enable network means responsive to said monitoring signals to simultaneously output a second of said forward enable inputs to said forward enable logic means and a second of said reverse enable inputs to said reverse enable logic means when said monitoring signals indicate all of said specified external functions are in a predetermined state.

35. The control circuit of claim 34 in which;
said circuit includes disable means responsive to the output of said enable network means to disable the command signal input to said first input stage means until said enable network means outputs said second of said forward enable inputs and said second of said reverse enable inputs.

36. The control circuit of claim 28 in which:
said control circuit includes armature responsive means for deriving armature signals corresponding with the instantaneous value of current applied to said armature;
current limiter network means for receiving said armature signals and providing an output representing armature current if said armature current exceeds a limit value;
means responsive to said current limiter network output to provide a second current limiter network output of opposite polarity; and
summing means responsive to the sum of said command network means output and said second current limiter network output to reduce the magnitude of said command network means output when armature current exceeds said reference value.

37. The control circuit of claim 36 in which:
said current limiter network means includes set means for providing a first current limit value corresponding to a motor stopped condition and a second current limit value corresponding to a motor operating condition;
second armature responsive means for deriving second armature signals corresponding with the instantaneous value of voltage applied to said armature; and
absolute magnitude amplifier stage means responsive to said second armature signals to actuate said set means to provide said second current limit value when the motor reaches said set operating condition.

38. The control circuit of claim 28 in which:
said circuit includes mixing means for directing select portions of said armature signals and said response adjusted output in common to said first input stage; and said circuit includes decoupling means responsive to the output of said integrator stage means to provide a deadband such that changes in said response adjusted output are not input to said mixing means when said response adjusted output is substantially equal in magnitude to the input to said first input stage means derived from the output of said mixing means.

39. The control circuit of claim 28 in which:

said circuit includes reverse delay network means for delaying the receipt of one of the first of said forward enable inputs by said forward enable logic means or the first of said reverse enable inputs by said reverse enable logic means when said directional comparator means provides said one of the first of said forward enable inputs or the first of said reverse enable inputs to cause the motor to change direction of rotation or to decelerate in the same direction to thereby prevent simultaneous forward and reverse gate signals; and reverse delay by-pass means to allow the first of said forward enable inputs to pass to said forward enable logic means or to allow the first of said reverse enable inputs to pass to said reverse enable logic means without incurring the delay of said reverse delay network means when said directional comparator means provides the first of said forward enable inputs or the first of said reverse enable inputs to cause the motor to maintain a constant speed or to accelerate in the same direction of rotation.

40. The control circuit of claim 28 in which:

said circuit includes absolute magnitude amplifier stage means responsive to said armature signals and said response adjusted output for deriving a motor activity signal; and threshold responsive means responsive to said motor activity signal and a predetermined threshold input to simultaneously effect the first of said forward enable inputs to said forward enable logic means and the first of said reverse enable inputs to said reverse enable logic means when the magnitude of said motor activity is less than the magnitude of said predetermined threshold input.

41. The control circuit of claim 28 in which:

said circuit includes ramp adjust means for simultaneously changing the slope of said first and second ramp means.

42. The control circuit of claim 28 in which:

said forward gate signals sequentially gate said forward and reverse designated switches in the same negative or positive region of line power during operation of the motor to enable the motor to regenerate power to the line when said response adjusted input calls for the motor to decrease speed or change direction.

* * * * *